US010607301B2

(12) United States Patent
Dareshani

(10) Patent No.: US 10,607,301 B2
(45) Date of Patent: Mar. 31, 2020

(54) METHODS AND SYSTEMS RELATING TO AUTO-GENERATED PRIVATE COMMUNITIES

(71) Applicant: MOBILITHINK SOLUTIONS INC., Nepean (CA)

(72) Inventor: Najmus Saqib Dareshani, Nepean (CA)

(73) Assignee: Mobilithink Solutions Inc., Nepean, Ontario (CA)

( * ) Notice: Subject to any disclaimer, the term of this patent is extended or adjusted under 35 U.S.C. 154(b) by 546 days.

(21) Appl. No.: 15/301,100

(22) PCT Filed: Mar. 31, 2015

(86) PCT No.: PCT/CA2015/000222
§ 371 (c)(1),
(2) Date: Sep. 30, 2016

(87) PCT Pub. No.: WO2015/149156
PCT Pub. Date: Oct. 8, 2015

(65) Prior Publication Data
US 2017/0024832 A1    Jan. 26, 2017

Related U.S. Application Data

(60) Provisional application No. 61/972,581, filed on Mar. 31, 2014.

(51) Int. Cl.
*G06Q 40/00* (2012.01)
*G06Q 50/00* (2012.01)
(Continued)

(52) U.S. Cl.
CPC .......... *G06Q 50/01* (2013.01); *G06Q 20/065* (2013.01); *G06Q 30/06* (2013.01); *G06Q 2220/00* (2013.01)

(58) Field of Classification Search
None
See application file for complete search history.

(56) References Cited

U.S. PATENT DOCUMENTS 8,578,038 B2 * 11/2013 Kaikuranta ........... G06F 3/0486
709/229
8,868,651 B2 * 10/2014 Roman ................ G06Q 10/101
709/204
(Continued)

FOREIGN PATENT DOCUMENTS

WO    WO 2011/064760    *    6/2011    ............. G06F 3/048

OTHER PUBLICATIONS

Lubke et al., "MobilisGroups: Location-based Group Formation in Mobile Social Networks", PerCol 2011: Second IEEE Workshop on Pervasive Collaboration and Social Networking, IEE 2011.*
(Continued)

*Primary Examiner* — Olabode Akintola
(74) *Attorney, Agent, or Firm* — Rosenberg, Klein & Lee

(57) ABSTRACT

Establishing online social communications for enterprises whilst beneficial to them in terms of revenue, customer retention etc. require skills and time, both of which the enterprises personnel do not possess. The inventors have established an inventive turn-key software application that allows an enterprise to create invitation only private groups on mobile device platforms and monetize aspects of this online private group through direct payments to the club owner. An individual, a group, a society, a business or enterprise irrespective of whether they are active on other social networks can exploit the inventive turn-key software application augmenting their business with clear visibility of the return on investment. As such the inventive turn-key (Continued)

software application provides an effective "one-stop shop" for those looking to establish and build their brand on mobile technology.

12 Claims, 16 Drawing Sheets

(51) Int. Cl.
*G06Q 30/06* (2012.01)
*G06Q 20/06* (2012.01)

(56) References Cited

U.S. PATENT DOCUMENTS

| | | | |
|---|---|---|---|
| 2008/0040437 A1* | 2/2008 | Agarwal | G06Q 10/107 709/206 |
| 2008/0182563 A1* | 7/2008 | Wugofski | G06Q 10/10 455/414.2 |
| 2013/0226699 A1* | 8/2013 | Long | G06Q 30/01 705/14.53 |

OTHER PUBLICATIONS

"Documentation for Confluence 5.4" (Atlassian, Dec. 2013), online: Confluence 5.4 Complete Documentation PDF. Retrieved from: http://downloads.atlassian.com/software/confluence/downloads/documentation/Confluence_5-4-0_CompleteDocumentation_PDF_CONF54-051213-2331-42.pdf.*

\* cited by examiner

111 — PaymentTransaction
- ◆ id INT(11)
- ◇ clubid INT(11)
- ◆ userid INT(11)
- ◆ status ENUM(...)
- ◆ transactiontype ENUM(...)
- ◆ amount DOUBLE
- ◆ paymentmethod VARCHAR(45)
- ◇ paymentid VARCHAR(45)
- ◇ transactiondate TIMESTAMP
- ◆ isactive INT(1)
- ◇ createdtimestamp TIMESTAMP
- ◆ modifiedtimestamp TIMESTAMP
- Indexes ▷

112 — EventRegistration
- ◆ id INT(11)
- ◆ clubid INT(11)
- ◆ eventid INT(11)
- ◇ invitationtype ENUM(...)
- ◇ sendtimestamp TIMESTAMP
- ◇ accepttimestamp TIMESTAMP
- ◇ transactionid INT(11)
- ◇ paymentmethodid INT(11)
- ◆ isactive INT(1)
- ◇ createdtimestamp TIMESTAMP
- ◆ modifiedtimestamp TIMESTAMP
- Indexes ▷

113 — AccountRegistration
- ◆ id INT(11)
- ◆ plantypeid INT(11)
- ◇ accountid INT(11)
- ◇ clubid INT(11)
- ◇ registrationstartdate TIMESTAMP
- ◇ registrationenddate TIMESTAMP
- ◇ registrationtermination TIMESTAMP
- ◆ duration DOUBLE
- ◇ Paymentmethodid INT(11)
- ◇ transactionid INT(11)
- ◆ isactive INT(1)
- ◇ createdtimestamp TIMESTAMP
- ◆ modifiedtimestamp TIMESTAMP
- Indexes ▷

114 — PlanType
- ◆ id INT(11)
- ◆ Name VARCHAR(45)
- ◆ Plantype ENUM(...)
- ◆ Amount DOUBLE
- ◆ Duration DOUBLE
- ◆ isactive INT(1)
- ◇ createdtimestamp TIMESTAMP
- ◆ modifiedtimestamp TIMESTAMP
- Indexes ▷

116 — EventMembers
- ◆ id INT(11)
- ◆ Eventid INT(11)
- ◆ Memberid INT(11)
- ◆ Isaccepted INT(1)
- ◇ acceptedtimestamp TIMESTAMP
- ◇ leavetimestamp TIMESTAMP
- ◆ isactive INT(1)
- ◇ createdtimestamp TIMESTAMP
- ◆ modifiedtimestamp TIMESTAMP
- Indexes ▷

115 — EventInfo
- ◆ id INT(11)
- ◆ clubid INT(11)
- ◆ eventtype ENUM(...)
- ◆ eventnature ENUM(...)
- ◆ amount DOUBLE
- ◆ name TEXT
- ◆ hostaccountid INT(11)
- ◇ eventstarttimestamp TIMESTAMP
- ◇ eventendtimestamp TIMESTAMP
- ◆ isalldaylongevent INT(1)
- ◆ isrepeat INT(1)
- ◆ eventtitle TEXT
- ◇ eventtext TEXT
- ◇ eventurl TEXT
- ◇ maxregistrations INT
- ◇ address VARCHAR(256)
- ◇ city VARCHAR(256)
- ◇ country VARCHAR(256)
- ◇ zipcode VARCHAR(10)
- ◇ locationlat VARCHAR(45)
- ◇ locationlong VARCHAR(45)
- ◇ eventdocs TEXT
- ◆ isactive INT(1)
- ◇ createdtimestamp TIMESTAMP
- ◆ modifiedtimestamp TIMESTAMP
- Indexes ▷

Figure 2

AccountType — 121
- ♦ id INT(11)
- ♦ name VARCHAR(45)
- ♦ amount DOUBLE
- ♦ duration INT
- ♦ isactive INT(1)
- ◊ createdtimestamp TIMESTAMP
- ♦ modifiedtimestamp TIMESTAMP
- Indexes ▷

AccountConnection — 123
- ♦ id INT(11)
- ♦ connectionfromaccountid INT(11)
- ♦ connectiontoaccountid INT(11)
- ♦ Isaccepted INT(1)
- ◊ Requestsentat TIMESTAMP
- ◊ Requestacceptedat TIMESTAMP
- ♦ isactive INT(1)
- ◊ createdtimestamp TIMESTAMP
- ♦ modifiedtimestamp TIMESTAMP
- Indexes ▷

PrivacySetting — 122
- ♦ id INT(11)
- ♦ clubid INT(11)
- ◊ accountid INT(11)
- ♦ restrictcontenttype ENUM(...)
- ♦ restrictvalue INT(1)
- ♦ isactive INT(1)
- ◊ createdtimestamp TIMESTAMP
- ♦ modifiedtimestamp TIMESTAMP
- Indexes ▷

PaymentMethod — 124
- ◊ id INT(11)
- ◊ clubid INT(11)
- ♦ userid INT(11)
- ♦ paymenttype ENUM(...)
- ♦ paymentid VARCHAR(45)
- ◊ issuedate VARCHAR(45)
- ♦ expirydate VARCHAR(45)
- ◊ cvv VARCHAR(45)
- ♦ firstname VARCHAR(45)
- ♦ lastname VARCHAR(45)
- ◊ address VARCHAR(45)
- ◊ city VARCHAR(45)
- ◊ state VARCHAR(45)
- ◊ country VARCHAR(45)
- ◊ zipcode VARCHAR(10)
- ♦ isactive INT(1)
- ◊ createdtimestamp TIMESTAMP
- ♦ modifiedtimestamp TIMESTAMP
- Indexes ▷

Account — 125
- ♦ id INT(11)
- ♦ accounttypeid INT(11)
- ♦ username VARCHAR(45)
- ♦ email VARCHAR(256)
- ♦ password VARCHAR(45)
- ♦ communicationhash VARCHAR(45)
- ◊ phone VARCHAR(16)
- ◊ jointtimestamp TIMESTAMP
- ◊ firstname VARCHAR(45)
- ◊ lastname VARCHAR(45)
- ◊ gender VARCHAR(1)
- ◊ biography TEXT
- ◊ fbaccount VARCHAR(256)
- ◊ twitteraccount VARCHAR(256)
- ◊ linkedaccount VARCHAR(256)
- ◊ profilepicture VARCHAR(256)
- ◊ profilestatus VARCHAR(256)
- ◊ address VARCHAR(45)
- ◊ city VARCHAR(45)
- ◊ state VARCHAR(45)
- ◊ country VARCHAR(45)
- ◊ zipcode VARCHAR(10)
- ◊ weburl VARCHAR(256)
- ◊ company VARCHAR(256)
- ◊ companywebsite VARCHAR(45)
- ♦ isactive INT(1)
- ◊ createdtimestamp TIMESTAMP
- ♦ modifiedtimestamp TIMESTAMP
- Indexes ▷

ClubRegistration — 131
- id INT(11)
- clubid INT(11)
- memberaccountid INT(11)
- isaccepted INT(1)
- transactionid INT(11)
- paymentmethod INT(11)
- startdate TIMESTAMP
- enddateisactive TIMESTAMP
- isactive INT(1)
- createdtimestamp TIMESTAMP
- modifiedtimestamp TIMESTAMP
- Indexes

Club — 132
- id INT(11)
- owneraccountid INT(11)
- clubuniquename VARCHAR(45)
- title VARCHAR(256)
- subtitle VARCHAR(256)
- description TEXT
- fees DOUBLE
- backgroundimage VARCHAR(255)
- fbaccount VARCHAR(255)
- twitteraccount VARCHAR(255)
- linkedaccount VARCHAR(255)
- contactemailid VARCHAR(255)
- contactphoneno VARCHAR(45)
- isactive INT(1)
- createdtimestamp TIMESTAMP
- modifiedtimestamp TIMESTAMP
- Indexes

Message — 133
- id INT(11)
- clubid INT(11)
- Messagetype ENUM(...)
- Subject TEXT
- Messagetext TEXT
- Sendtimestamp TIMESTAMP
- Attachedresources TEXT
- Attachedimages TEXT
- Attachedvideos TEXT
- Attachedfb TEXT
- Attachedtwitter TEXT
- Attachedlinkedin TEXT
- Locationlat VARCHAR(45)
- Locationlong VARCHAR(45)
- isactive INT(1)
- createdtimestamp TIMESTAMP
- modifiedtimestamp TIMESTAMP
- Indexes

ClubMembers — 134
- id INT(11)
- clubid INT(11)
- memberid INT(11)
- isaccepted INT(1)
- joindate TIMESTAMP
- leavedate TIMESTAMP
- isactive INT(1)
- createdtimestamp TIMESTAMP
- modifiedtimestamp TIMESTAMP
- Indexes

MessageRecipient — 135
- id INT(11)
- clubid INT(11)
- messageid INT(11)
- senderid INT(11)
- receiverid INT(11)
- isread INT(1)
- isactive INT(1)
- createdtimestamp TIMESTAMP
- modifiedtimestamp TIMESTAMP
- Indexes

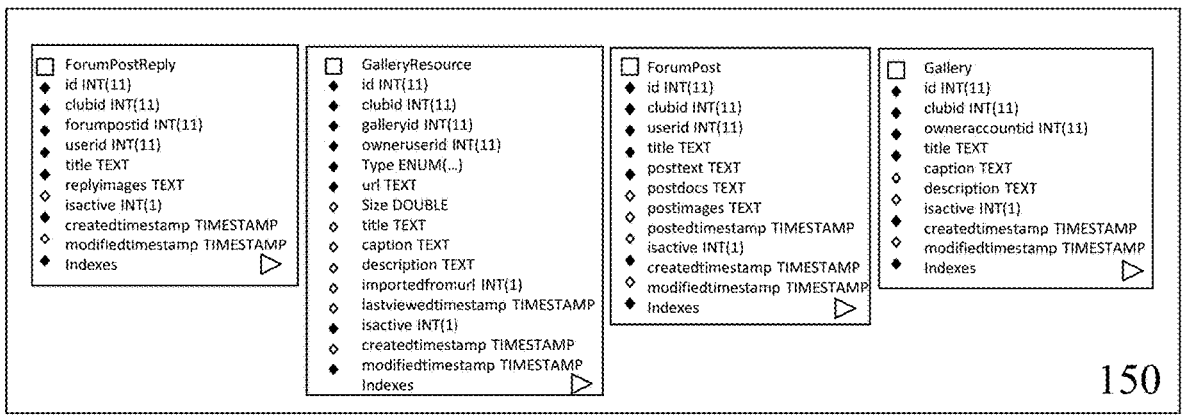
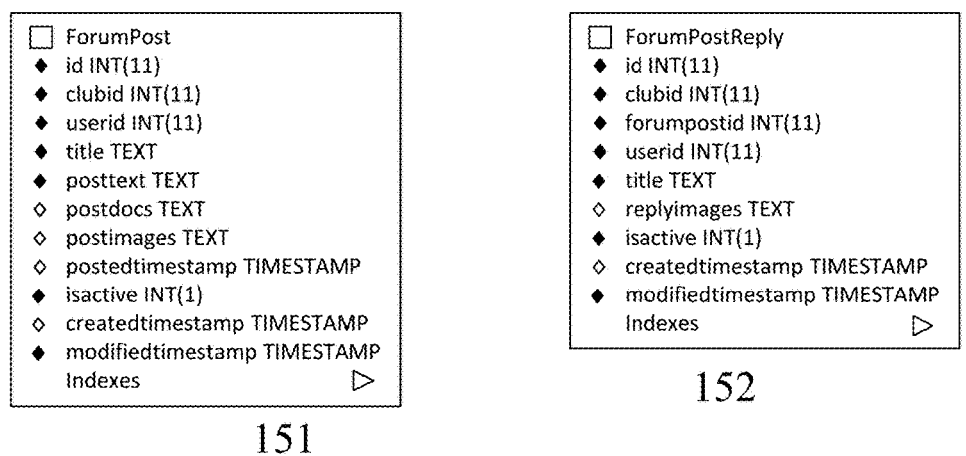
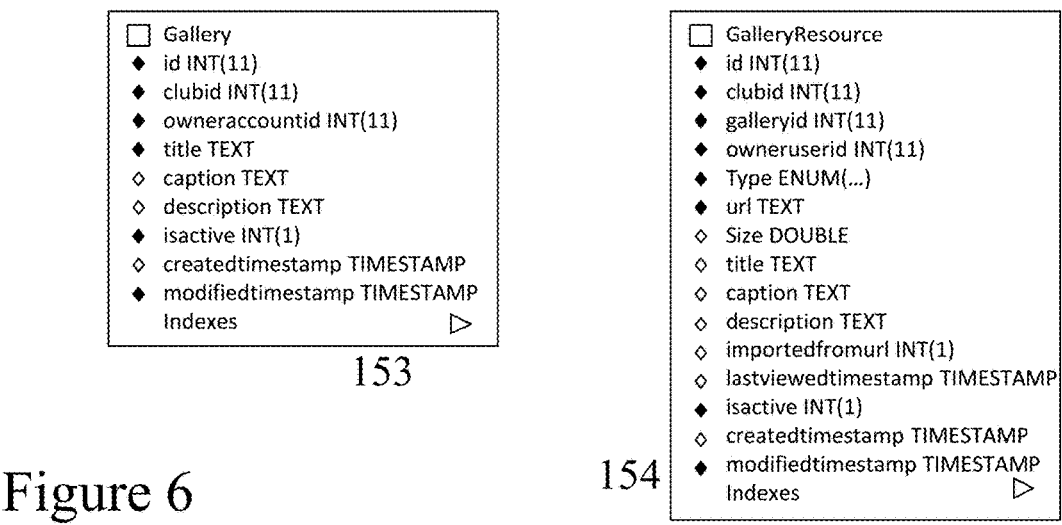
Figure 6

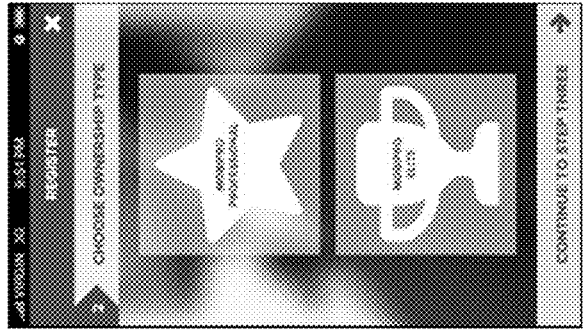
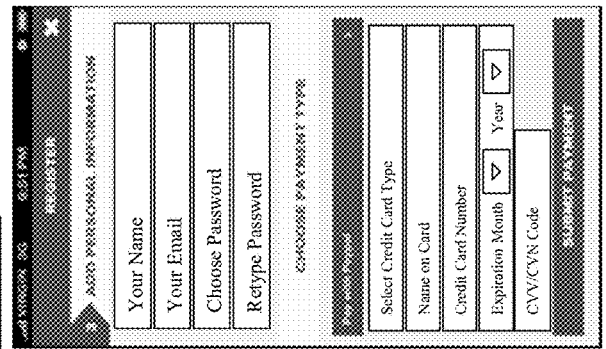
Figure 8
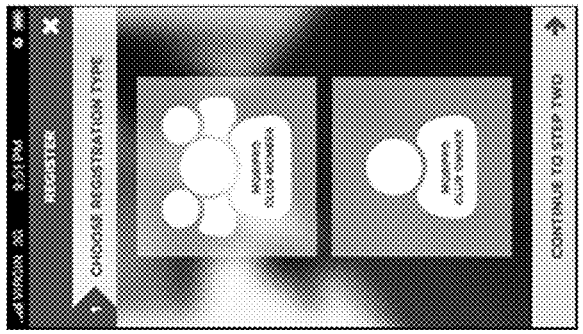
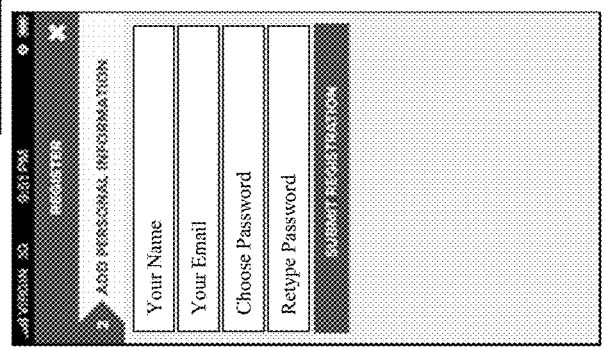
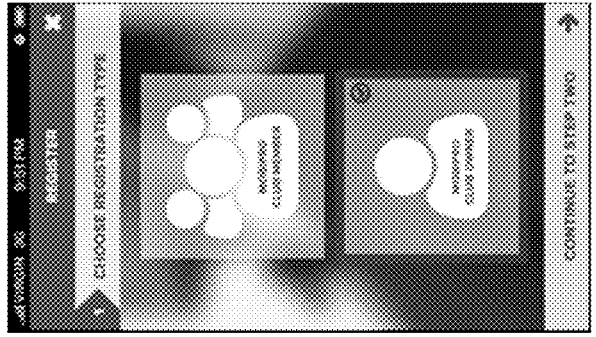
Figure 9

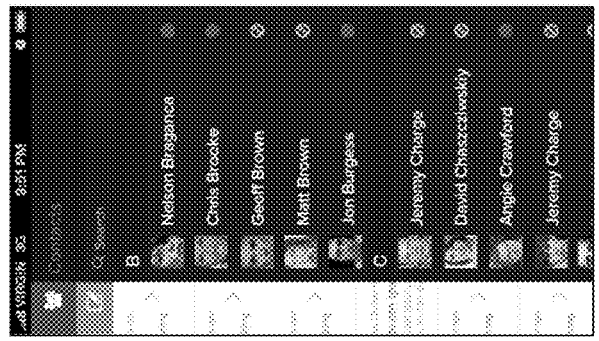
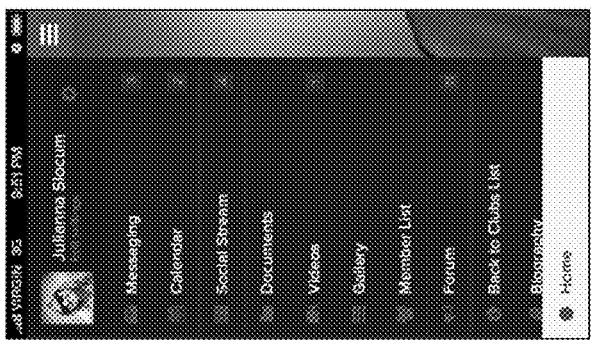
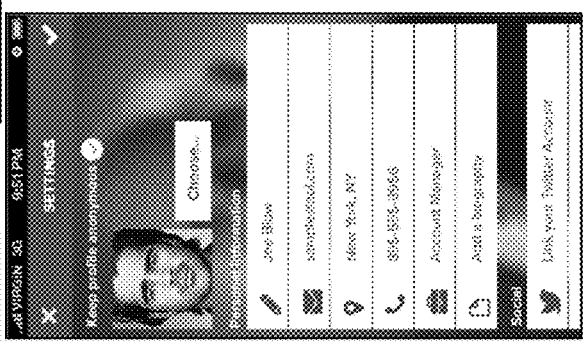
Figure 11
Figure 10

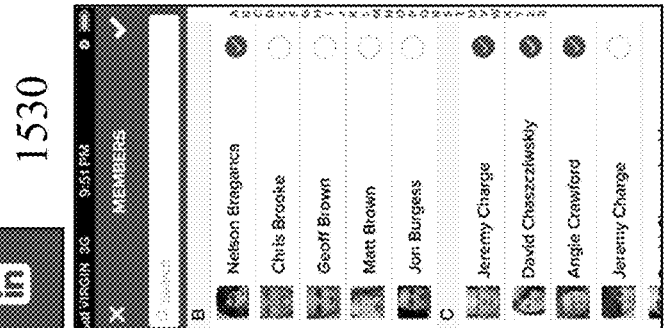
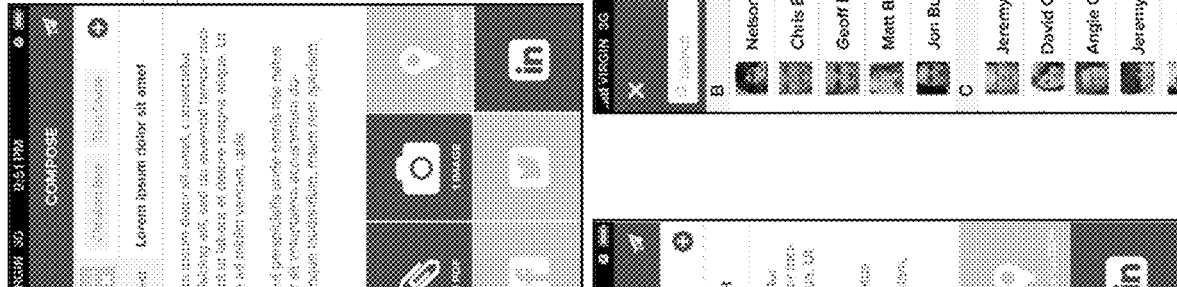
Figure 15
Figure 14

Figure 17
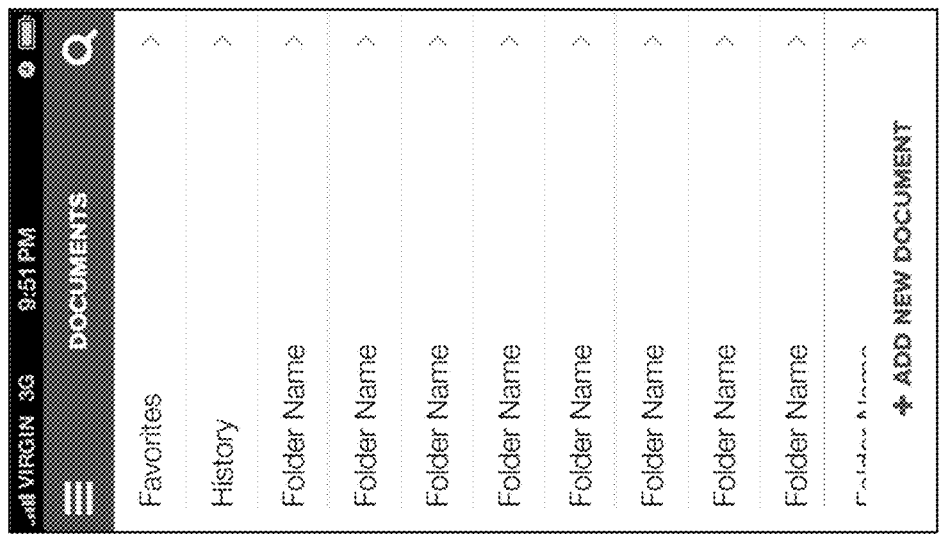
Figure 16
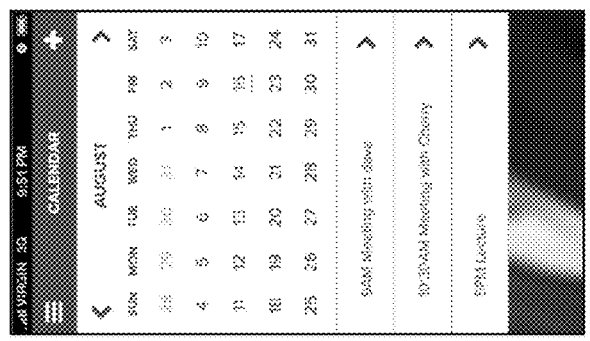
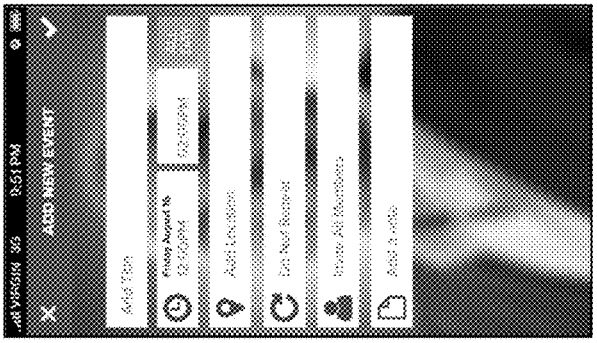
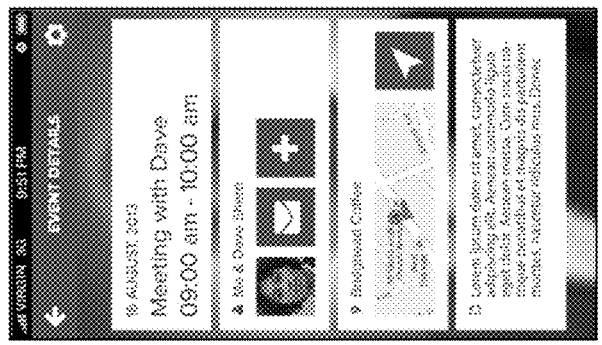

METHODS AND SYSTEMS RELATING TO AUTO-GENERATED PRIVATE COMMUNITIES

CROSS-REFERENCE TO RELATED APPLICATIONS

This patent application claims the benefit of Patent Cooperation Treaty Application PCT/CA2015/000222 entitled "Methods and Systems relating to Auto-Generated Private Communities" filed Mar. 31, 2015 which itself claims the benefit of U.S. Provisional Patent Application 61/972,581 filed Mar. 31, 2014 entitled "Methods and Systems relating to Auto-Generated Private Communities", the entire contents of both being incorporated herein by reference.

FIELD OF THE INVENTION

This invention relates to online clubs and cryptocurrencies and more particularly to automated frameworks for the provisioning of turnkey solutions for the establishment and operation of clubs by owners for members and payments to the club owner by members as well as limiting cryptocurrencies with respect to their use.

BACKGROUND OF THE INVENTION

Over the past decade the increasing power of microprocessors coupled with low cost electronic solutions, supporting cellular wireless services as well as personal and local area networks (PANs/LANs), low cost colour displays, social networks, and a range of different software applications have meant that access to information, content, and services has become ubiquitous. Today, users do not think about the technology behind their personal electronic devices and rather than running discrete software applications for specific functions they have become an integral part of their daily lives. Programs to schedule activities, generate reminders, provide rapid communication capabilities dominate but these devices also can contain sensitive personal information, financial information, etc. As such microprocessor based devices, what we once called computers, are increasingly present during virtually all of a person's daily activities both personal and business. As a result, a user may be presented with output information from one or more devices at any time, such as a combined in-vehicle navigation and graphical user interface, their smartphone, and a smart watch.

Accompanying this increasing access and portability of electronic devices is the tide of information, commonly referred to as content, generated by users, enterprises, Governments, and other individuals, groups, businesses, and service providers. With an estimated 100 billion plus web pages on over 100 million websites, and almost two billion users accessing this it's easy to understand but hard to comprehend how much data is being uploaded and downloaded every second on the Internet. Users are typically presented with this content by either soliciting for it, such as their performing a search or registering with a content source (e.g. a Rich Site Summary—RSS feed), via unsolicited communications from third parties who have acquired an electronic address for the user, or through implicit solicitation by associating a profile of themselves with a service such as a social network or social media.

Accordingly, through a convergence of computerization, wireless capabilities, digitalization, and ease of dissemination, the amount of potential information that may be bombarded on individual users may prove overwhelming whether solicited or unsolicited. In many instances this sheer volume of information may prevent or discourage users from making any effort to examine the information and find what is immediately desirable or necessary. For enterprises this also creates an issue in that they need to ensure that their brand is visible to users, is accessed by users, and supports the overall business activities of the enterprise. At the same time a large number of enterprises hope that the rapid expansions in social networks and social media generally can support and enhance their overall online presence but at present apart from very limited presences do not really understand how to leverage it to their benefit or integrate into their overall marketing plan. At the same time their options today within the prior art are typically based upon the establishment of a social network or a bespoke solution build and tailored to them by a web developer. However, social networks such as Facebook™, Twitter™, and Google Plus™ are inherently public in both their networks and associations between their users and whilst this may suit some enterprises, individuals for certain aspects of their activities they may wish to offer private/closed club features to all or a subset of their members. Today therefore bespoke/tailored web sites and web services are established at significant cost to these enterprises/individuals and require dedicated support to add/amend/delete content.

Concurrently with their grappling with these new avenues of communication they are also failing to appreciate and comprehend the fundamental shift that mobile devices are bringing at the same time, both in terms of how customers access and exploit online content but also as the first generations to grow up with it are becoming a commercially significant demographic in all aspects of commerce as they are now buying property, having children, etc. There are also increasing concerns over the openness of most social media applications and social networks and security for using them as commercial aspects of the enterprises overall operations.

The inventors have established an inventive turn-key software application that allows an enterprise to create invitation only private groups on mobile device platforms and monetize aspects of this online private group through direct payments to the club owner. An individual, a group, a society, a business or enterprise irrespective of whether they are active on free social networks such as Facebook™ and Twitter™ can exploit the inventive turn-key software application augmenting their business with clear visibility of the return on investment. As such the inventive turn-key software application provides an effective "one-stop shop" for those looking to establish and build their brand on mobile technology.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to address limitations within the prior art relating to online clubs and cryptocurrencies and more particularly to automated frameworks for the provisioning of turnkey solutions for the establishment and operation of clubs by owners for members and payments to the club owner by members as well as limiting cryptocurrencies with respect to their use.

In accordance with an embodiment of the invention there is provided a cryptocurrency having limitations as to the use of the cryptocurrency with at least one of an individual, an organization, a group, an enterprise, a product, a service, a class of service, and a class of goods.

In accordance with an embodiment of the invention there is provided a financial system having limitations as to the use of the financial system with at least one of an individual, an organization, a group, an enterprise, a product, a service, a class of service, and a class of goods.

In accordance with an embodiment of the invention there is provided a financial system having a least a limitation of a plurality of limitations as to the use of the financial system with respect to a cryptocurrency, the limitation relating to at least one of an individual, an organization, a group, an enterprise, a product, a service, a class of service, and a class of goods.

In accordance with an embodiment of the invention there is provided a system providing an owner with an automatically generated framework for a club relating to the owner for access by a plurality of members.

In accordance with an embodiment of the invention there is provided a system providing an owner with an automatically generated framework for a club relating to the owner for access by a plurality of members, wherein the automatically generated framework is generated in dependence upon data provided by the owner through a graphical user interface upon a portable electronic device.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIGS. 2 to 6 depict sections of the database model of FIG. 1 in expanded form according to an embodiment of the invention;

FIGS. 8 and 9 depict registration screens for a mobile application according to an embodiment of the invention;

FIG. 10 depicts club listing screens and setting screen for a mobile application according to an embodiment of the invention;

FIG. 11 depicts home screens for a mobile application according to an embodiment of the invention;

FIG. 14 depict message and message thread screens for a mobile application according to an embodiment of the invention;

FIG. 15 depicts message composition and message target screens for a mobile application according to an embodiment of the invention;

FIG. 16 depicts calendar and calendar event screens for a mobile application according to an embodiment of the invention;

FIG. 17 depicts a document management screen for a mobile application according to an embodiment of the invention;

DETAILED DESCRIPTION

Figure 1:
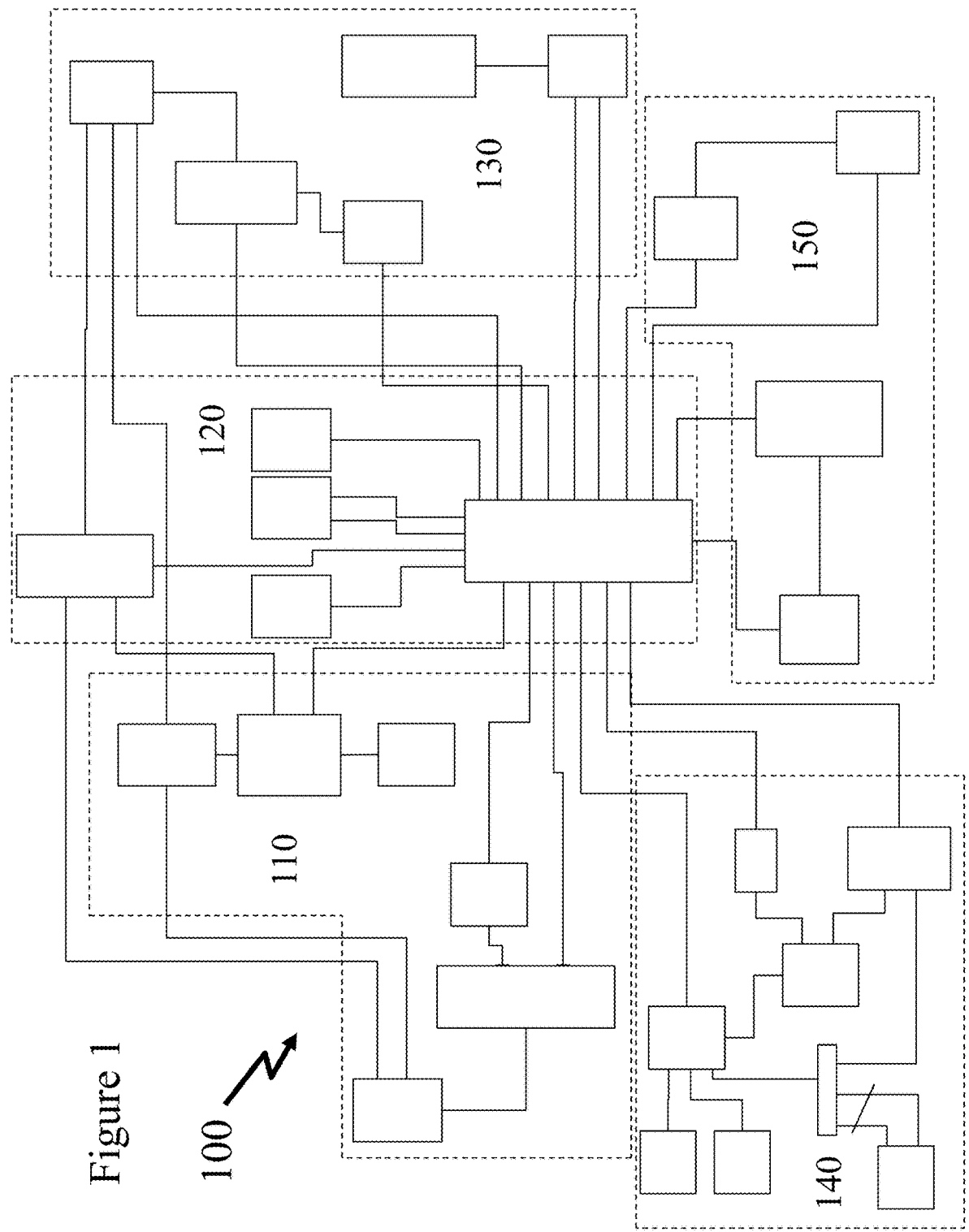
FIG. 1 depicts a database model for a mobiChamp™ club according to an embodiment of the invention.

The present invention is directed to online clubs and cryptocurrencies and more particularly to automated frameworks for the provisioning of turnkey solutions for the establishment and operation of clubs by owners for members and payments to the club owner by members as well as limiting cryptocurrencies with respect to their use.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

An "application" (commonly referred to as an "app") as used herein may refer to, but is not limited to, a "software application" and an element of a "software suite" as used herein may refer to, but is not limited to, a computer program designed to allow an individual to perform an activity. Generally, within the following description with respect to embodiments of the invention an application is generally presented in respect of software permanently and/or temporarily installed upon a PED and/or FED.

"Social media" or "social media services" as used herein may refer to, but is not limited to, a means of interaction among people in which they create, share, and/or exchange information and ideas in virtual communities and networks. This includes, but is not limited to, social media services relating to magazines, Internet forums, weblogs, social blogs, microblogging, wikis, social networks, podcasts, photographs or pictures, video, rating and social bookmarking as well as those exploiting blogging, picture-sharing, video logs, wall-posting, music-sharing, crowdsourcing and voice over IP, to name a few. Social media services may be classified, for example, as collaborative projects (for example, Wikipedia); blogs and microblogs (for example, Twitter™); content communities (for example, YouTube and DailyMotion); social networking sites (for example, Facebook™); virtual game-worlds (e.g., World of Warcraft™); and virtual social worlds (e.g. Second Life™).

A "social network" or "social networking service" as used herein may refer to, but is not limited to, a platform to build social networks or social relations among people who may, for example, share interests, activities, backgrounds, or real-life connections. This includes, but is not limited to, social networks such as U.S. based services such as Facebook, Google+, Tumblr and Twitter; as well as Nexopia, Badoo, Bebo, VKontakte, Delphi, Hi5, Hyves, iWiW, Nasza-Klasa, Soup, Glocals, Skyrock, The Sphere, StudiVZ, Tagged, Tuenti, XING, Orkut, Mxit, Cyworld, Mixi, renren, weibo and Wretch.

An "enterprise" as used herein may refer to, but is not limited to, a provider of a service and/or a product to a user, customer, or consumer. This includes, but is not limited to, a retail outlet, a store, a market, an online marketplace, a manufacturer, an online retailer, a charity, a utility, and a service provider. Such enterprises may be directly owned and controlled by a company or may be owned and operated by a franchisee under the direction and management of a franchiser.

A "service provider" as used herein may refer to, but is not limited to, a third party provider of a service and/or a product to an enterprise. This includes, but is not limited to, a retail outlet, a store, a market, an online marketplace, a manufacturer, an online retailer, a utility, an own brand provider, and a service provider wherein the service and/or product is at least one of marketed, sold, offered, and distributed by the enterprise solely or in addition to the service provider.

A "user" as used herein may refer to, but is not limited to, an enterprise, a service provider, and an individual accessing at least one of a software system and/or a software application according to embodiments of the invention from the viewpoint of activities including, but not limited to, publishing information, establishing a club, joining a club, paying for a service and/or product, and receiving payments. An "owner" as used herein may refer to, but is not limited to, an enterprise, a service provider, and an individual accessing at least one of a software system and/or a software application according to embodiments of the invention from the viewpoint of activities including, but not limited to, publishing information, receiving information, establishing a club, and receiving payments from members. A "member" as used herein may refer to, but is not limited to, an enterprise, a service provider, and an individual accessing at least one of a software system and/or a software application according to embodiments of the invention from the viewpoint of activities including, but not limited to, receiving information, joining a club, and paying for a service and/or product.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed or contained in discrete files. Viewed narrowly, types of digital content include popular media types such as MP3, JPG, AVI, TIFF, AAC, TXT, RTF, HTML, XHTML, PDF, XLS, SVG, WMA, MP4, FLV, and PPT, for example, as well as others, see for example http://en.wikipedia.org/wiki/List_of_file_formats. Within a broader approach digital content mat include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is at least one of generated, selected, created, modified, and transmitted in response to a user request, said request may be a query, a search, a trigger, an alarm, and a message for example.

Reference to "content information" as used herein may refer to, but is not limited to, any combination of content features, content serving constraints, information derivable from content features or content serving constraints (referred to as "content derived information"), and/or information related to the content (referred to as "content related information"), as well as an extension of such information (e.g., information derived from content related information).

Reference to a "document" as used herein may refer to, but is not limited to, any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.). In the context of the Internet, a common document is a Web page. Web pages often include content and may include embedded information (such as meta-information, hyperlinks, etc.) and/or embedded instructions (such as Javascript, etc.). In many cases, a document has a unique, addressable, storage location and can therefore be uniquely identified by this addressable location such as a universal resource locator (URL) for example used as a unique address used to access information on the Internet.

mobiChamp™ Club Software and Applications/Platforms

As noted supra an enterprise currently must build, establish, maintain and grow its brand against the convergence of computerization, wireless capabilities, digitalization, and ease of dissemination, that at present lead to immense volumes of information preventing or discouraging users. These issues are compounded by the diversity of online channels to their target demographic/users from quick Twitter™ tweets through blogs, Facebook™ posts, social networks, social media profiles, to audiovisually through Vines™ and YouTube™. As also noted supra the inventors have established an inventive turn-key software application that allows an enterprise to create invitation only private groups on mobile device platforms and monetize aspects of this online private group. For simplicity through this specification the inventors refer to this as "mobiChamp" although it would be evident to one of skill in the art that embodiments of the invention may be branded and marketed with under a variety of names. Whilst the software implementations of embodiments of the invention may be described and discussed within this specification in respect of the establishment of clubs, mobiChamp™ and other embodiments of the invention allow individuals, group, societies, businesses and enterprises, irrespective of whether they are active on free social networks such as Facebook™ and Twitter™, the ability to augment their business with a mobile online application offering a "one-stop shop" for those looking to establish and build their brand on mobile technology without being limited to providing private member clubs. Accordingly, the owner of a club may monetize their brand through subscription fees, membership fees, special event fees, etc. However, to ease description of embodiments of the invention and its implementation these are presented from the viewpoint of a private club. Accordingly, from the member perspective they wish to login into mobiChamp™ then access a list of the clubs they are a part of wherein they can then select the appropriate club, sees the owner profile and can interact with other Members of the club. Equally, they can also see invitations to other clubs. In this manner, a user can access easily a plurality of clubs and interact within each club as well as other members. Accordingly, for the user mobiChamp™ provides a consistent interface to a plurality of clubs and a single portal rather than multiple portals through multiple applications.

From the Owner's viewpoint upon logging in then they can see a list of the clubs they have created. For example, a golf club might create a club for general members, a club for its staff, and a club for its professionals. Alternatively, an enterprise may create one for each companies/organization within the enterprise or one per type of product or even one per product such is the ease and speed of creating clubs within mobiChamp™.

As an example consider Bill Gates as an Owner. He might establish the following clubs:

Microsoft Elite Club: providing messaging, push notifications, media storage, cloud based service sharing (e.g. Dropbox) sharing only for this group and not the outside world (no Facebook/Twitter);

Bill Melinda Foundation Executives Club—messages, push notifications, special events, etc. only for this elite club/group; and Leadership Club—as Bill Gates gives speeches and gets paid $100,000 per speech, so he has a special membership for users to join who pay $999/month to be part of this private club/group.

Subsequently, for the Leadership Club he wishes to notify club members of a special event, once generated by him the communication is distributed as a push notification for the special event to take place in Jacksonville, Fla. Additionally, an Owner can also send and receive private messages, similar to Members.

Referring to FIG. 1 there is depicted a database model 100 for a mobile online application (MOA) according to an embodiment of the invention which is arbitrarily sub-divided into first and fifth blocks 110 to 150 respectively which are expanded in FIGS. 2 to 6 respectively. In this implementation the database model 100 relates to a MOA generated according to an embodiment of the invention for a club, MobiGolf™. Referring to FIG. 2 for first block 110 there are depicted first to sixth database elements 111 to 116 respectively, these being Payment Transaction, Event Registration, Account Registration, Plan Type, and Event Info. In FIG. 3 there are depicted seventh to eleventh database elements 117 to 125 respectively of second block 120. These are Account Type, Privacy Settings, Account Connection, Payment Method and Account.

Figure 5:
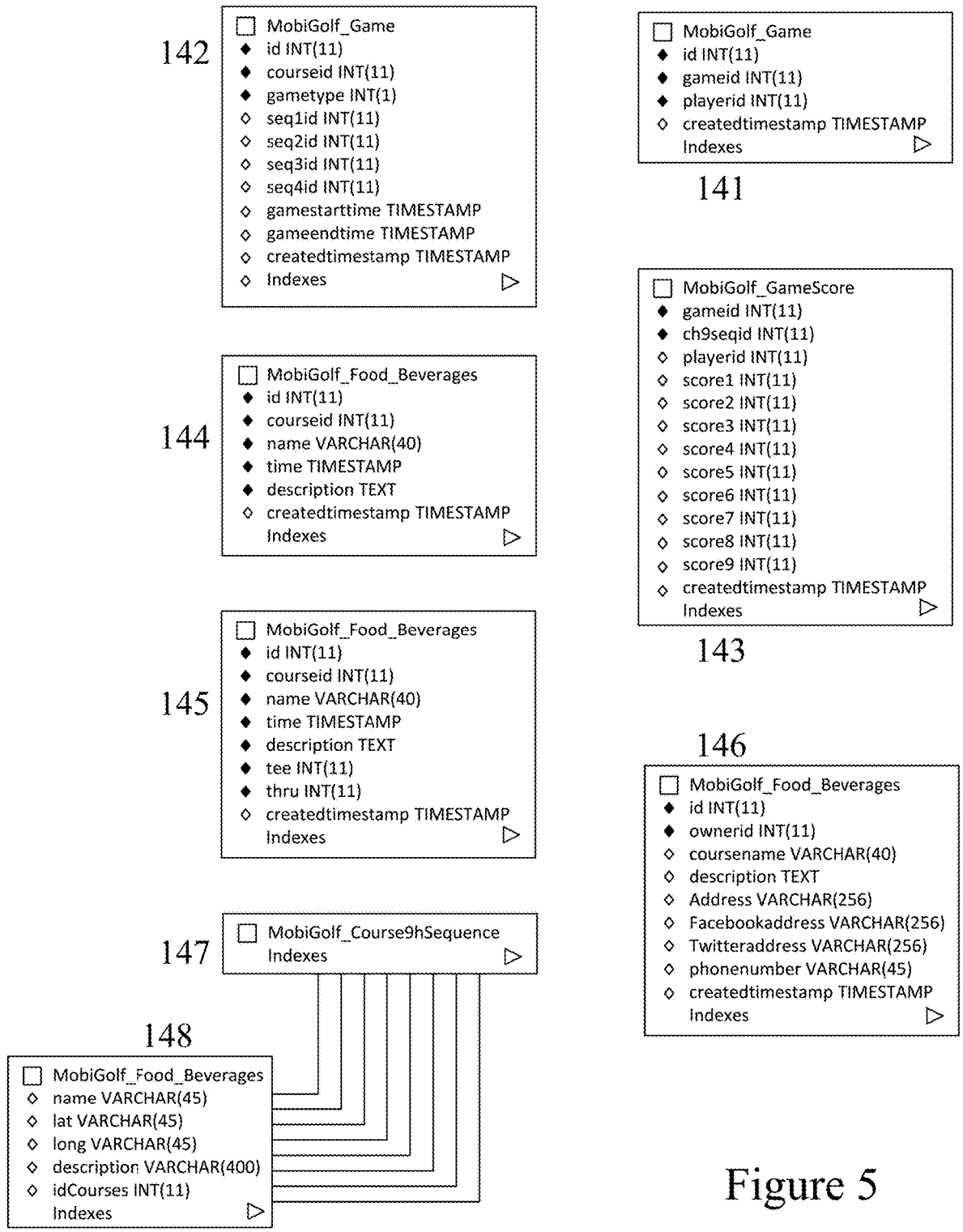

FIG. 4 depicts third block 130 comprising Club Registration, Club, Message, Club Members, and Member Recipient in twelfth to sixteenth database elements 131 to 135 respectively. Similarly FIG. 5 depicts fourth block 140 comprising MobiGolf™ Gameplayers, MobiGolf™ Game, MobiGolf™ GameScore, MobiGolf™ Food Beverages, MobiGolf™ Leader Boards, MobiGolf™ Courses, MobiGolf™ Course 9-hole Sequence, MobiGolf™ GPS in seventeenth to twenty-fourth database elements 141 to 148 respectively. Twenty-fifth to twenty-ninth database elements 151 to 154 respectively are depicted in FIG. 5 for fifth block 150 which are Forum Post, Forum Post Reply, Gallery, and Gallery Resource respectively.

According to embodiments of the invention MobiGolf™ may represent, for example, a private club for a single golf course, e.g. "Gleneagles" in Scotland, or it may represent a private club for members of a club offering special events, pricing, etc. to its members such as ClubLink overall, or offering several private clubs to members within different specific geographic aspects or other membership cross-sections. For example, ClubLink may establish one club for Mont Tremblant region of Quebec, Canada and another for the Muskoka region of Ontario, Canada.

Figure 7:
FIG. 7 depicts splash and login screens for a mobile application according to an embodiment of the invention.

Now referring to FIG. 7 there are depicted exemplary splash and login screens 720 and 730 respectively for a mobile application according to an embodiment of the invention. Splash screen 720 being triggered by a user selecting the mobiChamp™ application icon 715 on device user interface 710. The splash screen 720 gives way to login screen 720 wherein the user is presented with a drop down menu 732 which allows the user to browse a list of clubs for use in conjunction and then either to register through register button 734 or login through login interface 736 wherein the user presents login credentials, in this instance email address and password. The list of clubs presented to the user in drop down menu 732 may, for example, be a standard list of clubs which are geographically derived or alternatively it may be based upon an initial user entry sequence associated with their downloading of the software application. Alternatively, initially the user must be invited to join a first club wherein subsequent to their registration other club options are presented to them. Optionally, the drop down menu 732 is a hierarchal sequence of menus allowing a large number of clubs options to be refined by user selections. Drop down menu 732 therefore provides, typically, a list of "private clubs" that their owners are advertising, for example to the public, so they can join. The joining may, for example, be linked to providing registration details and be free, by providing an initial membership fee, or by executing a subscription document.

The user's selection of a club from the drop down menu 732 and their selection of the register button 734 may transmit a request to the club for membership to a club organizer wherein the club organizer authorizes their request prior to the user being provided with the registration screens in FIGS. 8 and 9 described below. Alternatively, their selection of drop down menu 732 and their selection of the register button 734 may trigger their being provided with the registration screens in FIGS. 8 and 9 described below wherein subsequently their application for registration is vetted by a club organizer, for example. Alternatively, the user may be seeking to establish a club through mobiChamp™ and accordingly does not make a selection through drop down menu 732 and simply selects registration 734 wherein they are then directed to registration screens in order to complete initial registration details wherein rather than a club organizer vetting their registration the provider of the overall mobiChamp™ system vets their registration request.

Accordingly, referring to FIG. 8 the user is presented with first registration screen 810 wherein they select that they are either registering as a mobiChamp™ club member or as a mobiChamp™ club owner thereby triggering the highlighting of the selected option, as depicted in second and third screens 820 and 830 respectively. If the user selects mobiChamp™ club owner then they are subsequently presented with first screen 910 in FIG. 9 wherein the user can select to either create a professional club or elite club. Subsequently the user seeking to establish the club is directed to second screen 920 wherein the user is asked to enter their name, email address, choose their password, and confirm their password. In contrast, the user seeking to register with an existing club is linked directly to third screen 930 wherein they are asked to similarly enter their name, email address, choose their password, and confirm their password. However, they are also asked to select a payment type for their membership. As depicted the user is given the options of PayPal or Credit Card. If they opt for credit card then they are also asked to provide the name on the credit card, the credit card number, expiration details, and the card verification number (CVN) or card verification value (CVV). The user then selects to submit payment.

Referring to FIG. 10 there are depicted first and second club listing screens 1010 and 1020 respectively together with user setting screen 1030 for a mobile application according to an embodiment of the invention providing clubs to users through mobiChamp™ The user may be directed to first screen 1010 when the user has completed their login, for example, wherein they are able to browse the clubs they are members of. In first club listing screen 1010 these are depicted as Andre Agassi, Donald Trump, Oprah Winfrey, and Kobe Bryant, for example together with a browse button that allows the user to then subsequently browse through an extended list of clubs in second screen 1020. Those depicted initially in first screen 1010 may, for example, be those most frequently visited by the user although other selection processes for the clubs depicted on the top of the list may be employed, such as those known to those in the art. In addition to an image for each club a short summary below lists the club name, e.g. Andre Agassi, the club descriptor/reference, e.g. Tennis Pro, and the number of members, e.g. 109. In third screen 1030 the user can adjust their profile settings, such as name, email address, location, phone number, title, plus has the option to add a biography and the ability to add social media links, e.g. Twitter™, Facebook™ LinkedIn™, etc. Additionally, the user may select a profile image and has the option to keep their profile anonymous from other members of the club. Optionally, these settings may be common to all clubs the user is a member of or they may be set/varied for each club.

Figure 12:
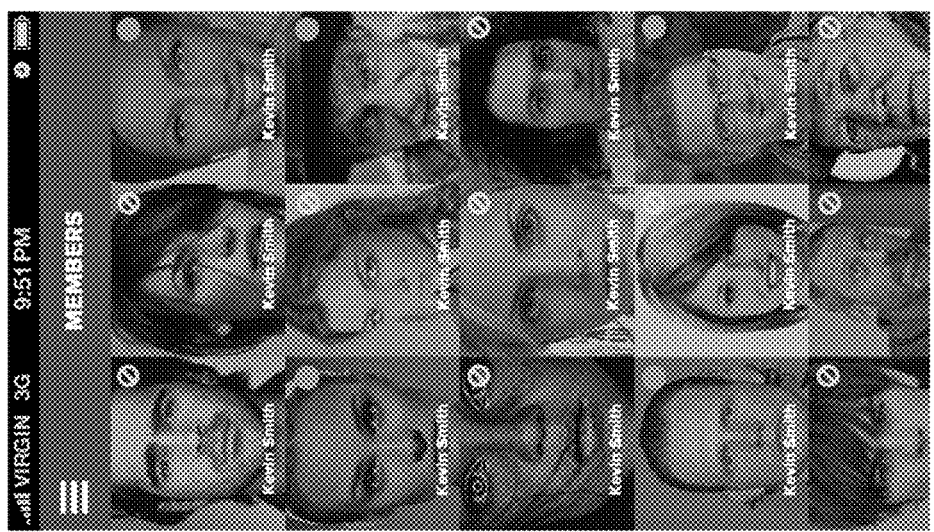
FIG. 12 depicts a contacts screen for a mobile application according to an embodiment of the invention.

Referring to FIG. 11 there is depicted a first home screen 1110, also known as "Club Home Screen" and depicted as "Andre Agassi Club" as an example, for a user together with a second home screen 1120 and contacts screen 1130. Referring to second home screen 1120, also known as the "Main Screen", the user is presented with various functions accessible to them including, but not limited to, messaging, calendar, social stream, documents, videos, gallery, member list, and forum together with user setting such as biography as well as a navigation back to their clubs list and a home button to take them back to their home screen. Others may be accessible by scrolling the displayed list although the home button is kept visible at all times. Accordingly, where the user selects on these functions, e.g. documents, then they are presented with those elements associated with that function that relate to the club they are currently logged into. For example, if the user selects to view their contacts then they are taken to contacts screen 1130 which presents a scroll list of contacts together with a status icon for each of those contacts. Within embodiments of the invention these contacts may be specific to the club they are or they may alternatively be all of their contacts. A status indicator adjacent to each user may for example relate to whether they are a member of the club the user is currently in. Alternatively, the indicator dot may indicate whether a member is online or not, in case the member/owner wants to chat with that member and it would be evident that owners of other clubs can also be members to other clubs. Alternatively, if the user selects the members function then they may for example be taken to contacts screen 1210 in FIG. 12 wherein the user is presented with a scroll screen of members within the club that they are currently logged into. Adjacent to each member there is depicted an indicator that indicates whether the member is currently a contact or not. Within some embodiments of the invention members and contacts may be non-overlapping lists of individuals, enterprises, etc. whilst in other embodiments of the invention the two may be synonymous.

Figure 13:
FIG. 13 depicts different dashboard screens for a mobile application according to an embodiment of the invention.

Referring to FIG. 13 there are depicted first to fourth dashboard screens 1310 to 1340 respectively for a club owner accessing their private club through their mobiChamp™ mobile application according to an embodiment of the invention. Accordingly, in this example Andre Agassi can see in first dashboard screen 1310 can see that he has 1,055 members, have so far earned $10,055 through the club, and dashboard bar allowing them to rapidly move between social media in first dashboard screen 1310 to calendar, return on investment (ROI), and statistics in second to fourth dashboard screens 1320 to 1340 respectively. For example in second dashboard screen 1320 a meeting is shown within the calendar whilst in third dashboard screen 1330 they can see the forthcoming ROI which in this instance is through booked lessons, videos, and tickets to events. Finally, in fourth dashboard screen 1340 the club owner can see statistics relating to their club which in this instance are number of members, number of new members this week, and demographic split. It would be evident to one skilled in the art that each dashboard screen may be alternatively presented as a scroll list or that the items displayed on a dashboard may be user configured from a list of available options.

If a user selects a messaging option within a dashboard, home screen, etc. then as depicted in respect of FIG. 14 they may be presented with message screen 1410 and message thread screen 1420 within a mobile application according to an embodiment of the invention. Considering message screen 1410 then the user is presented with an inbox depicted messages from contacts within the club that they are currently logged into. Tapping a message within the message screen 1410 results in option pop-out allowing the user to reply, forward, view thread or delete the message. Selecting view thread results in presentation of message thread screen 1420 wherein a message is opened to display the series of communications within it. Within an embodiment of the invention the message screen 1410 may present multiple message formats, e.g. e-mail, text, simple message service (SMS) etc. Optionally, a "Global Inbox" feature may be provided which will allow all new messages from all clubs to be visible with one inbox (instead of logging in to each club and then accessing the inbox). Alternatively, the "Global Inbox" feature may provide the user with the ability to establish a subset of their clubs, i.e. those that they consider timely notification of messages to be important to them, such that these are centralized whilst others are accessed directly through the clubs or are filtered to a secondary mailbox within the "Global Inbox" feature.

With respect to FIG. 15 there are depicted message composition screen 1510, reply message screen 1520, and message target screen 1530 for a mobile application according to an embodiment of the invention. Accordingly, in message composition screen 1510 a user is able to compose a message add documents, add images, add a GPS location, as well as selecting the members to whom it will be sent as well as what channels it will be sent through. In the screen image shown the user has selected LinkedIn™ whilst also being able to select Facebook™ and Twitter™. Optionally, the message compose screen provides automatically the channel options based upon the members selected such that common channels to the members are provided as options. Optionally, the exploitation of social media may be preferentially set such that these are presented ahead of other options such as SMS, text, and email for example. Where multiple network options exist then these may be provided as options for the user to select otherwise a default option may be presented in the event of no common social media/social network. During composition the user may access a member list which depicts all members when they are the club owner or only those members that are contacts in the instance that the user is a member. Standard scroll and indexed access may be provided as depicted in message target screen 1530.

Where a user selects calendar option then they may be presented as depicted in FIG. 16 with calendar and calendar event screens such as depicted in first to third calendar screens 1610 to 1630 respectively for a mobile application according to an embodiment of the invention. Accordingly, first calendar screen 1610 depicts a month view wherein the user can select a day through tapping the day wherein the events for that day are displayed below and simple navigations allow the user to scroll through to a previous or following month and for each calendar event a side-swipe accesses a detail screen, such as depicted in second calendar screen 1620 wherein the meeting details are outlined with title, time, location (including map) and information relating to the meeting. Adding a diary event leads the user to third calendar screen 1630 wherein they may enter details such as title, date, time, location, repetition, member invite (e.g. specific member(s) or all members etc.) and a note. Typically, a club owner will be sole meeting organizer but within alternate embodiments of the invention a club owner may grant calendar access to one or more members who are part of their entourage for example so that they are not performing all the activities relating to managing a private club based upon themselves and/or their enterprise.

Figure 18:
FIG. 18 depicts gallery access screens and new media addition screen for a mobile application according to an embodiment of the invention.

Within a club an owner may add documents as part of their club activities as well as users may access posted documents arising from events, activities, etc. within the club(s) they are a member of. Accordingly, as depicted in FIG. 17 a document management screen 1710 provides users with a management tool for this content such that documents may be stored within user defined portfolios for ease of personal recall. In the even that they select add a new document then an owner may add new content whilst a member may add a new document to their library. In order to not lose the privacy aspect of the club then the documents may be in fact stored images that selection triggers a hypertext link to the content such that a user cannot download the documents. Alternatively, as depicted in second home screen 1120 in FIG. 11 a user/owner may link to/add content in the form of visual content. Accordingly in FIG. 18 there are depicted user gallery access screen 1810 as well as first and second owner new media addition screens 1820 and 1830 respectively. Accordingly, a user through user gallery access screen 1810 may access content within the club and add this to their personal gallery. As with the documents discussed supra in respect of FIG. 17 such added content may in fact be links or non-downloadable content. In first and second owner new media addition screens 1820 and 1830 respectively the owner of a club may view the gallery content of their club, first owner new media addition screen 1820, or add new gallery content for their club, second owner new media addition screen 1830.

Figure 19:
FIG. 19 depicts video content access screens for a mobile application according to an embodiment of the invention.

Similarly, as depicted in second home screen 1120 in FIG. 11 a user/owner may link to/add audiovisual content in the form of audiovisual content, e.g., video although computer animation, multimedia content etc. may be within this section or have its own. Accordingly in FIG. 19 there is depicted owner video access screen 1910 as well as user video access screen 1920. Accordingly, a user through user video access screen 1920 may access video within the club and add this to their personal gallery. As with the documents discussed supra in respect of FIG. 17 such added content may in fact be links or non-downloadable content. In owner video access screen 1910 the owner of a club may add new video content for their club. Other screens allowing user to view available content for selection/preview may be provided as may a screen for the owner to view what video content is already associated with the club. In many instances content in sections such as document, video, image etc. may be linked.

Additionally, as depicted in second home screen 1120 in FIG. 11 a user/owner may establish a forum or post to a forum respectively. Unlike messaging discussed supra the forum is available to all members allowing a discussion or discussions to be generated, managed, and added to. For example, first screen 2010 depicts message thread relating to a forum, second screen 2020 the addition of a post to a forum, and third image 2030 the latest posts to a forum. Optionally, the forum link from, for example, second home screen 1120, may take the user to a forum listing screen identifying the currently active forums. Optionally, the owner may establish alternate closed forums that are only accessible to those members the owner adds. For example, Donald Trump may establish a forum only for property developers who are members of his club and another for chief executives.

Figure 21:
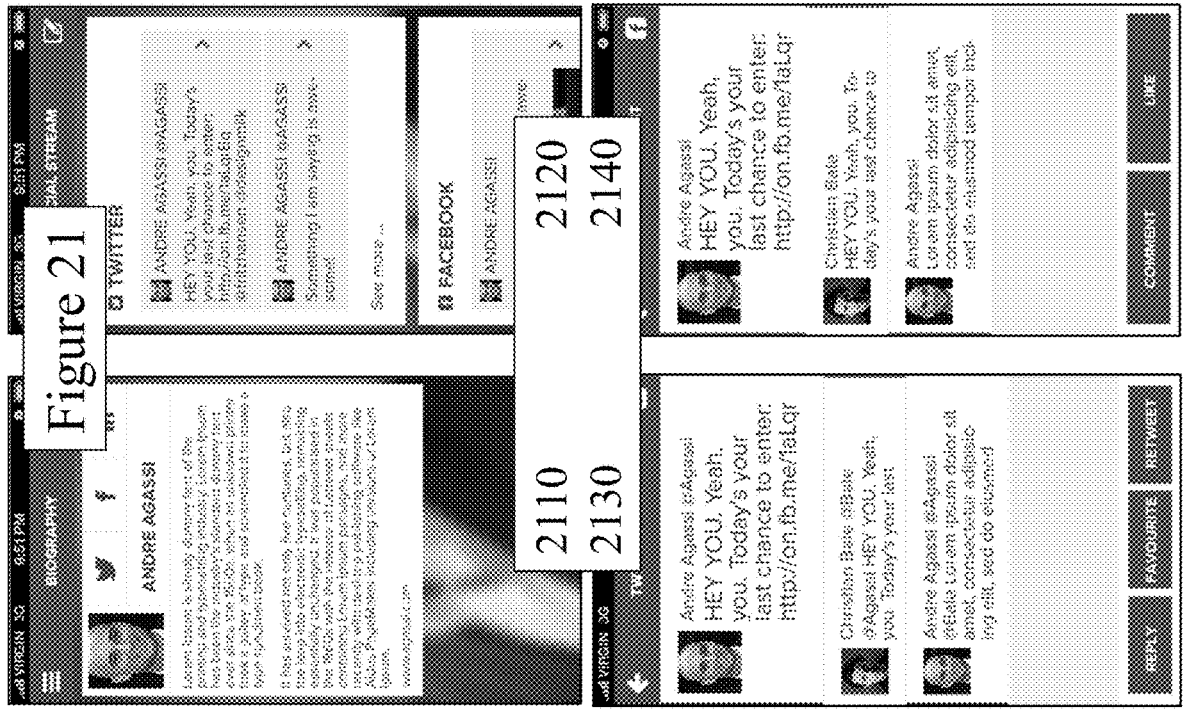
FIG. 21 depicts a biography screen and social media screens for a mobile application according to an embodiment of the invention.
Figure 20:
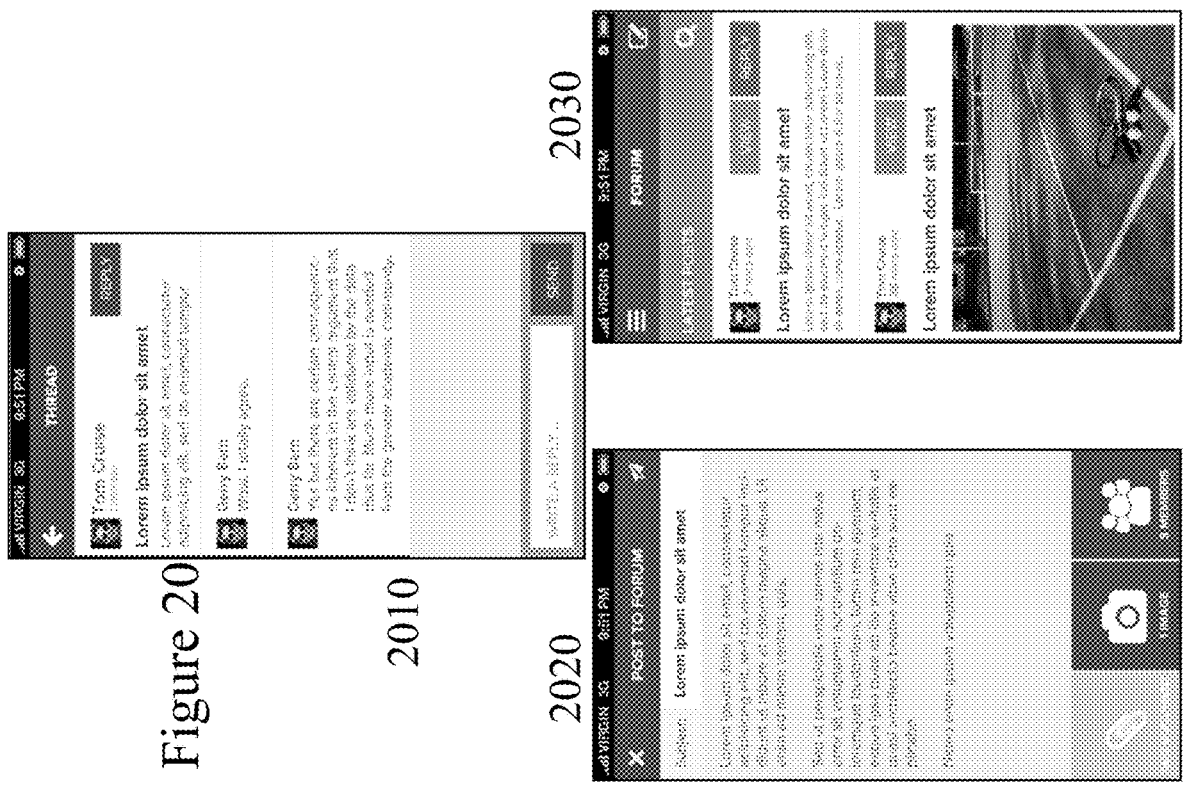
FIG. 20 depicts forum screens for a mobile application according to an embodiment of the invention.

Also accessible from second home screen 1120 depicted in FIG. 11 are biography and social stream options. The biography option as depicted in first screen 2110 in FIG. 21 allows the member/owner to generate a biography for themselves accessible to others as part of their profile. Optionally, as depicted the user may push their biography to their social media profiles as depicted by the icons at the top of the first screen 2110. These icons may represent the social networks to which the biography is posted and will subsequently be posted to upon revision, and which were selected from a menu option, or alternatively these are social networks the member/owner is active upon and selecting an icon pushes the current biography to that selected social network. Optionally, the biography screen will also provide club information as the member/owner may wish to have different biographies within different clubs and accordingly to ease reference as to which is visible the club name and/or logo for example may be depicted. Accordingly, the owner/member is provided with a one-step content creation system that the owner, for example, filters. Hence, considering Bill Gates as an owner then clearly he is a busy person, and he would not want to log into multiple site such as LinkedIn™, Facebook™ and mobiChamp™ to upload content. However, mobiChamp™ allows the user to generate content from one location, and then choose where that content will be published based upon what the user chooses. So Bill Gates can choose a mobiChamp™ forum only for content to be published to, or he can choose to publish to mobiChamp™, LinkedIn™, Twitter™ and Facebook™ at the same time which would save valuable time. When the owner generates within mobiChamp™ then they are able to establish a filter as to whether the content being generated is public, private, or both. If private then the content only goes into the mobiChamp™ club, and if it's both then it will go to both, etc. It is also possible for an owner of multiple clubs when selecting private for them to select which club(s) it goes to in a more restricted manner as well as to all if they wish. Also accessible through second home screen 1120 depicted in FIG. 11 are the user's social media channels which if there are multiple social media channels for the user are initially presented through a social media channel option screen, not shown for simplicity, that allows the user to select one of their social media channels for that club. Accordingly, as depicted in first to third social media stream screens 2120 to 2140 the user in this instance has Twitter™ and Facebook™ although they may have access to any of the SOCNETs/SOMEs.

Whilst the embodiments of the invention described supra in respect of FIGS. 1 to 21 have been primarily discussed with respect of a private club for an owner, e.g. an individual or an enterprise, which they monetize through their members it would also be evident that an enterprise, individual, charity, organization may exploit the clubs as a mechanism for crowd sourcing information, content, knowledge, or finances. For example, an enterprise may crowd fund an initial product development, prototype, etc. and securely communicate to the members of that club who have by their membership contributed to the crowd sourced funding.

Further, within embodiments of the invention described supra in respect of FIGS. 1 to 21 it would be evident that the club owner and the club member are both presented with multiple features and options allowing them to customize their club or their access to the club respectively. Accordingly, in addition to the features described supra the following options may also be provided:

Clubs screen—may provide notifications such as badges to indicate whether there is a new message, etc.;

A club owner may at their discretion enable or disable social media access from the club depending on the privacy settings, such that for example the social media functions described above may be completely disabled;

A club owner may at their discretion limit the members that can contact can see other members, cannot see other members, can connect or cannot connect to other members such that within sensitive private groups, such as for example a child protection services group or a rape crisis group, that members can access information etc. but not communicate with others;

A club owner may at their discretion establish when creating a new club the fees associated with the club, i.e. owner may say the member must pay $99/month to be a member, pay an initial $99 and $1.99 per month, or that membership can be free but other fees are due for content etc.;

A club owner may at their discretion, when creating a new event or uploading new content (e.g. a document/video/photo etc.) stipulate a fee or fees associated with the new event and/or new content;

A club owner may at their discretion, sell targeted sponsored advertisements that displayed within the SSSA for their club as an extra source of revenue which is beneficial to the advertiser as it is likely each club will be have a list of members with similar interests;

A club owner may at their discretion may release their approximate GPS location from the mobiChamp™ app if they so choose as well as which private club members can see on an integrated map within the club;

A club member may at their discretion release their approximate GPS location from the mobiChamp™ app if they so choose for other members to see on an integrated map within the club;

A club member may at their discretion adjust their privacy settings that could lead to the member to being completely anonymous to other members, predetermined subsets of the members, and in some instances where sensitivity relates to the member's identity from the club owner as well.

Figure 22:
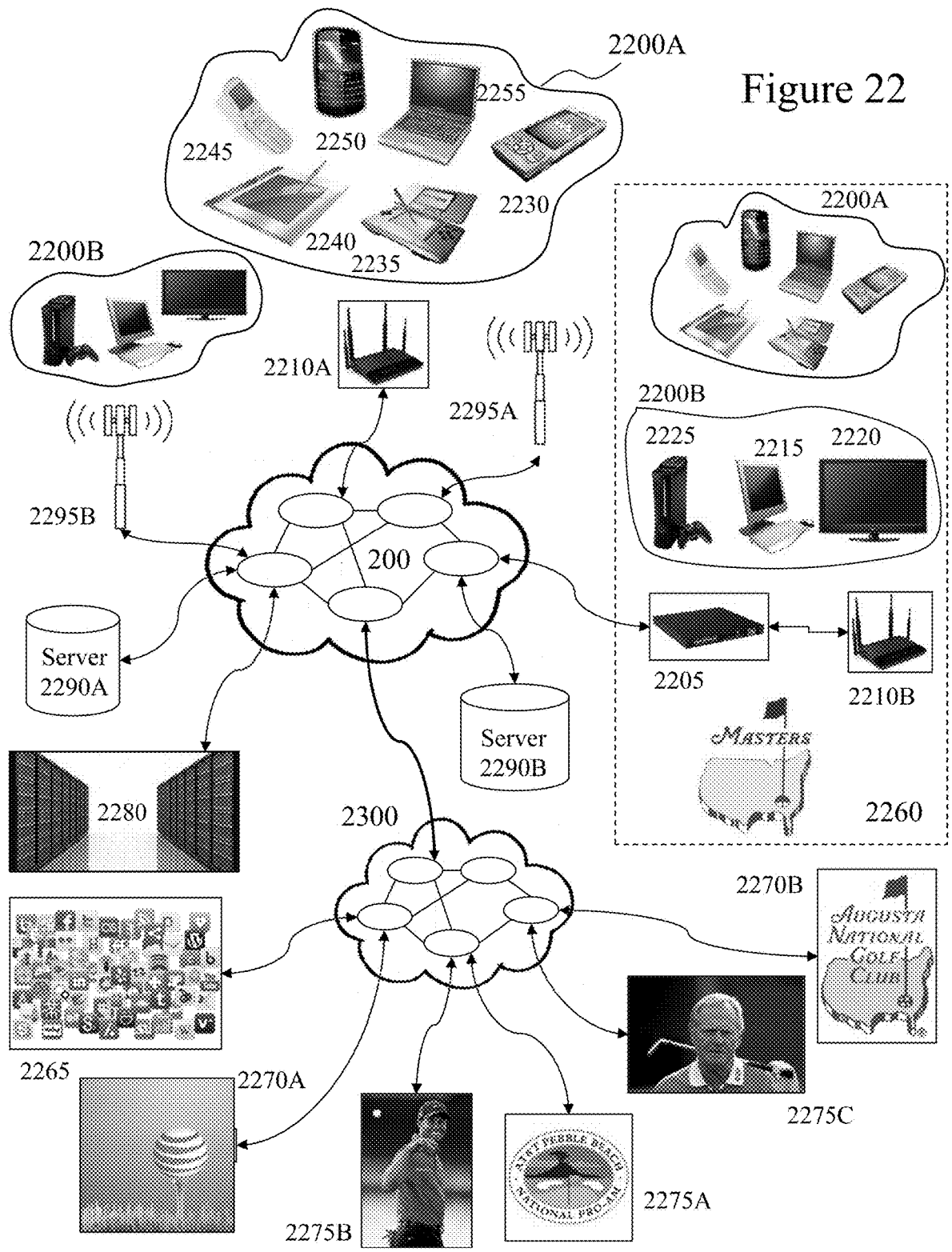
FIG. 22 depicts a network environment within which embodiments of the invention may be employed.

Referring to FIG. 22 there is depicted a network environment within which embodiments of the invention may be employed supporting private club systems and applications/platforms (PCSAPs) according to embodiments of the invention. Within the embodiment described below in respect of FIGS. 22 and 23 the business context is described in respect of golf. However, it would be evident to one skilled in the art that the business vertical and the user(s) and/or enterprise(s) within each business vertical exploiting embodiments of the invention may be any business vertical. For example, business verticals may include, but not be limited to, film, music, sports, news media, finance, banking, environment, energy, mining, commerce, retailers, manufacturers, government, charity, and regulatory authorities. Within each business vertical a club accessed through an application or applications according embodiments of the invention may be associated with, but not be limited to, an individual, a group of individuals, an entrepreneur, a founder, a guru, a consultant, a consultancy, an enterprise, an industry association, a regulatory body, a chartered society, a community, and a geographical region.

Such PCSAPs, for example supporting multiple channels and dynamic content. As shown first and second user groups 2200A and 2200B respectively interface to a telecommunications network 2300. Within the representative telecommunication architecture a remote central exchange 2280 communicates with the remainder of a telecommunication service providers network via the network 2300 which may include for example long-haul OC-48/OC-192 backbone elements, an OC-48 wide area network (WAN), a Passive Optical Network, and a Wireless Link. The central exchange 2280 is connected via the network 2300 to local, regional, and international exchanges (not shown for clarity) and therein through network 2300 to first and second cellular APs 2295A and 2295B respectively which provide Wi-Fi cells for first and second user groups 2200A and 2200B respectively. Also connected to the network 2300 are first and second Wi-Fi nodes 2210A and 2210B, the latter of which being coupled to network 2300 via router 2205. Second Wi-Fi node 2210B is associated with Enterprise 2260, e.g. the "Masters" golf tournament, within which are other first and second user groups 2200A and 2200B. Second user group 2200B may also be connected to the network 2300 via wired interfaces including, but not limited to, DSL, Dial-Up, DOCSIS, Ethernet, G.hn, ISDN, MoCA, PON, and Power line communication (PLC) which may or may not be routed through a router such as router 2205.

Within the cell associated with first AP 2210A the first group of users 2200A may employ a variety of PEDs including for example, laptop computer 2255, portable gaming console 2235, tablet computer 2240, smartphone 2250, cellular telephone 2245 as well as portable multimedia player 2230. Within the cell associated with second AP 2210B are the second group of users 2200B which may employ a variety of FEDs including for example gaming console 2225, personal computer 2215 and wireless/Internet enabled television 2220 as well as cable modem 2205. First and second cellular APs 2295A and 2295B respectively provide, for example, cellular GSM (Global System for Mobile Communications) telephony services as well as 3G and 4G evolved services with enhanced data transport support. Second cellular AP 2295B provides coverage in the exemplary embodiment to first and second user groups 2200A and 2200B. Alternatively the first and second user groups 2200A and 2200B may be geographically disparate and access the network 2300 through multiple APs, not shown for clarity, distributed geographically by the network operator or operators. First cellular AP 2295A as show provides coverage to first user group 2200A and Enterprise 2260, which comprises second user group 2200B as well as first user group 2200A. Accordingly, the first and second user groups 2200A and 2200B may according to their particular communications interfaces communicate to the network 2300 through one or more wireless communications standards such as, for example, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-2000. It would be evident to one skilled in the art that many portable and fixed electronic devices may support multiple wireless protocols simultaneously, such that for example a user may employ GSM services such as telephony and SMS and Wi-Fi/WiMAX data transmission, VOIP and Internet access. Accordingly portable electronic devices within first user group 2200A may form associations either through standards such as IEEE 802.15 and Bluetooth as well in an ad-hoc manner.

Also connected to the network 2300 are Social Networks (SOCNETS) 2265, first and second service providers 2270A and 2270B respectively, e.g. AT&T™ and Augusta National Golf Club, and first to third party providers 2275A to 2275C respectively, e.g. AT&T Pebble Beach National Pro-Am competition, Tiger Woods, and Jack Nicklaus, as well as first and second servers 2290A and 2290B which together with others, not shown for clarity. First and second servers 2290A and 2290B may host according to embodiments of the inventions multiple services associated with a provider of publishing systems and publishing applications/platforms (PCSAPs); a provider of a SOCNET or Social Media (SOME) exploiting PCSAP features; a provider of a SOCNET and/or SOME not exploiting PCSAP features; a provider of services to PEDS and/or FEDS; a provider of one or more aspects of wired and/or wireless communications; an Enterprise 2260 exploiting PCSAP features; license databases; content databases; image databases; content libraries; customer databases; websites; and software applications for download to or access by FEDs and/or PEDs exploiting and/or hosting PCSAP features. First and second primary content servers 2290A and 2290B may also host for example other Internet services such as a search engine, financial services, third party applications and other Internet based services.

Accordingly, a consumer and/or customer (CONCUS) may exploit a PED and/or FED within an Enterprise 2260, for example, and access one of the first or second primary content servers 2290A and 2290B respectively to perform an operation such as accessing/downloading an application which provides PCSAP features according to embodiments of the invention; execute an application already installed providing PCSAP features; execute a web based application providing PCSAP features; or access content. Similarly, a CONCUS may undertake such actions or others exploiting embodiments of the invention exploiting a PED or FED within first and second user groups 2200A and 2200B respectively via one of first and second cellular APs 2295A and 2295B respectively and first Wi-Fi nodes 410A.

Figure 23:
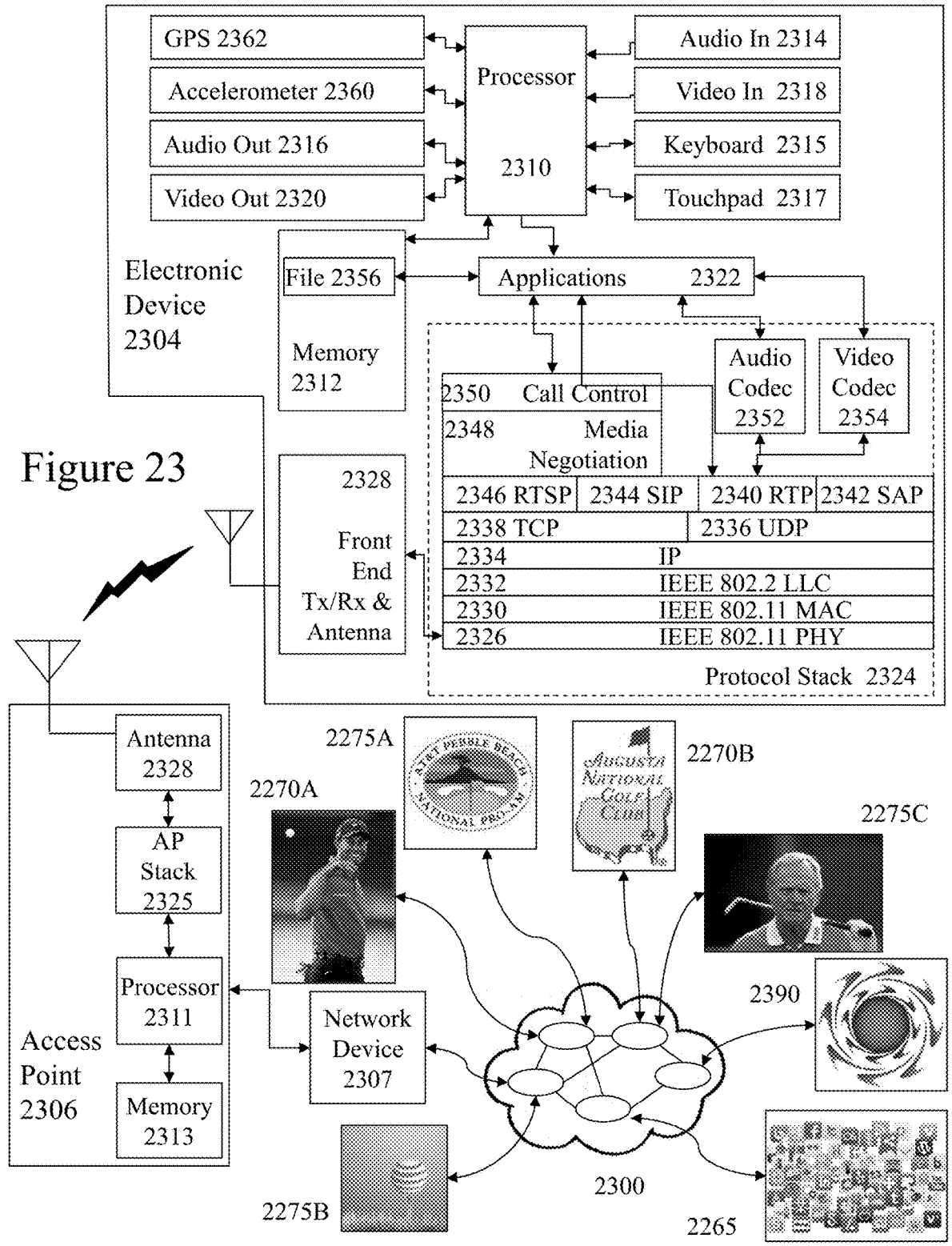
FIG. 23 depicts a wireless portable electronic device supporting communications to a network such as depicted in FIG. 22 and as supporting embodiments of the invention.

Now referring to FIG. 23 there is depicted an electronic device 2304 and network access point 2307 supporting PCSAP features according to embodiments of the invention. Electronic device 2304 may, for example, be a PED and/or FED and may include additional elements above and beyond those described and depicted. Also depicted within the electronic device 2304 is the protocol architecture as part of a simplified functional diagram of a system 2300 that includes an electronic device 2304, such as a smartphone 2255, an access point (AP) 2306, such as first AP 2210, and one or more network devices 2307, such as communication servers, streaming media servers, and routers for example such as first and second servers 2290A and 2290B respectively. Network devices 2307 may be coupled to AP 2306 via any combination of networks, wired, wireless and/or optical communication links such as discussed above in respect of FIG. 22 as well as directly as indicated. Network devices 2307 are coupled to network 2300 and therein Social Networks (SOCNETS) 2265, first and second service providers 2270A and 2270B respectively, first to third party providers 2275A to 2275C respectively, and biometric database service provider 2390.

The electronic device 2304 includes one or more processors 2310 and a memory 235 coupled to processor(s) 2310. AP 2306 also includes one or more processors 2311 and a memory 2313 coupled to processor(s) 2310. A non-exhaustive list of examples for any of processors 2310 and 2311 includes a central processing unit (CPU), a digital signal processor (DSP), a reduced instruction set computer (RISC), a complex instruction set computer (CISC) and the like. Furthermore, any of processors 2310 and 2311 may be part of application specific integrated circuits (ASICs) or may be a part of application specific standard products (ASSPs). A non-exhaustive list of examples for memories 2312 and 2313 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

Electronic device 2304 may include an audio input element 2314, for example a microphone, and an audio output element 2316, for example, a speaker, coupled to any of processors 2310. Electronic device 2304 may include a video input element 2318, for example, a video camera or camera, and a video output element 2320, for example an LCD display, coupled to any of processors 2310. Electronic device 2304 also includes a keyboard 2315 and touchpad 2317 which may for example be a physical keyboard and touchpad allowing the user to enter content or select functions within one of more applications 2322. Alternatively the keyboard 2315 and touchpad 2317 may be predetermined regions of a touch sensitive element forming part of the display within the electronic device 2304. The one or more applications 2322 that are typically stored in memory 2312 and are executable by any combination of processors 2310. Electronic device 2304 also includes accelerometer 2360 providing three-dimensional motion input to the process 2310 and GPS 2362 which provides geographical location information to processor 2310.

Electronic device 2304 includes a protocol stack 2324 and AP 2306 includes a communication stack 2325. Within system 2300 protocol stack 2324 is shown as IEEE 802.11 protocol stack but alternatively may exploit other protocol stacks such as an Internet Engineering Task Force (IETF) multimedia protocol stack for example. Likewise AP stack 2325 exploits a protocol stack but is not expanded for clarity. Elements of protocol stack 2324 and AP stack 2325 may be implemented in any combination of software, firmware and/or hardware. Protocol stack 2324 includes an IEEE 802.11-compatible PHY module 2326 that is coupled to one or more Front-End Tx/Rx & Antenna 2328, an IEEE 802.11-compatible MAC module 2330 coupled to an IEEE 802.2-compatible LLC module 2332. Protocol stack 2324 includes a network layer IP module 2334, a transport layer User Datagram Protocol (UDP) module 2336 and a transport layer Transmission Control Protocol (TCP) module 2338.

Protocol stack 2324 also includes a session layer Real Time Transport Protocol (RTP) module 2340, a Session Announcement Protocol (SAP) module 2342, a Session Initiation Protocol (SIP) module 2344 and a Real Time Streaming Protocol (RTSP) module 2346. Protocol stack 2324 includes a presentation layer media negotiation module 2348, a call control module 2350, one or more audio codecs 2352 and one or more video codecs 2354. Applications 2322 may be able to create maintain and/or terminate communication sessions with any of devices 2307 by way of AP 2306. Typically, applications 2322 may activate any of the SAP, SIP, RTSP, media negotiation and call control modules for that purpose. Typically, information may propagate from the SAP, SIP, RTSP, media negotiation and call control modules to PHY module 2326 through TCP module 2338, IP module 2334, LLC module 2332 and MAC module 2330.

It would be apparent to one skilled in the art that elements of the electronic device 2304 may also be implemented within the AP 2306 including but not limited to one or more elements of the protocol stack 2324, including for example an IEEE 802.11-compatible PHY module, an IEEE 802.11-compatible MAC module, and an IEEE 802.2-compatible LLC module 2332. The AP 2306 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module. Portable and fixed electronic devices represented by electronic device 2304 may include one or more additional wireless or wired interfaces in addition to the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-2000, DSL, Dial-Up, DOCSIS, Ethernet, G.hn, ISDN, MoCA, PON, and Power line communication (PLC).

Accordingly, the embodiments of the invention as described supra in respect of FIGS. 1 to 23 provide a range of features to users including, but not limited to Node-based Chat Integration; Combined Message Inbox (Combine Facebook, LinkedIn, Email and mobiChamp™ Mail); Message creation, sending, and receipt features; "Star" messages from club owners to members; Archive features for viewing previously sent/received messages; Push Notifications (messages received, new events, etc.); Upload and View Videos on Private Server and YouTube Channel; Upload and View Avatar Pictures; Photo Gallery Upload and View Photos; and DropBox Integration (allowing owner and members to share files).

In order to make the mobiChamp™ clubs easy for owners then they have the ability to work with, establish, and manage a club using features including, but not limited to, Ability to edit, add, manage all club content and club activities directly from a portable electronic device; Send Custom Targeted Ads (preferably via DoubleClick); Owner authorization/login through Facebook; Owner authorization/login through LinkedIn; SOCNET functionality and ease of use, e.g. LinkedIn; and Internally to mobiChamp™ PCSAP access applications such as Google+™.

Additionally members may be provided with other mobiChamp™ features including, but not limited to, Events and integration on event management tools, e.g. EventBrite™; Simple payment integration to collect membership fees, event fees, content related fees, etc. as necessary through services such as PayPal™ in addition to more tradition credit card payment; View events lists; View contact lists; View member online status; View member lists; and Link owner/enterprise SOCNET/SOME content, e.g. aboutt.me, Google+™ Pinterest™, Flickr™, Twitter™, Facebook™, YouTube™, and LinkedIn™.

Within the mobiChamp™ PCSAP the member and/or owner are presented with different screens in respect of their activities as they follow the flows established through the database model, such as database model 100 in FIG. 1 for example. As anticipated there are differences/nuances between the "Member" version and the "Owner" versions. A terminology change may appear throughout wherein rather than a user who may be a Member or Owner we now differentiate the Member and Owner a little more specifically.

Splash Screen: Common to both Member and Owner. The Splash Screen would only change if the Owner has their own specific application on the application store (in which case the application name and the Splash picture would reflect that of the Owner).

Login Screen: Typically there will be two main buttons: "Login" button and a "Register" Button. A background video or "flying text" may be playing, showcasing the benefits of mobiChamp™. There may also be a "link" called "Discover Clubs", right above the "Register" button, right justified relative to the screen.

"Discover Clubs" that will allow non-registered users (non-Members and non-Owners) to only view the Clubs that are currently on mobiChamp™. If the user wishes to join the club, then the "Register" pop-up would come and if the user presses "Ok" they would be led to the Registration screen (as if they had pressed on the Registration Button). Ideally the application would be smart enough to remember which choice the user had chosen once they had finished registering.

Registration Screen: A help bubble may appear to explain the difference between an "Owner" and a "Member". Once inside the registration screen, it will allow the user to sign up for "Owner" status in the application and provide PayPal or credit card details via Stripe. If a user wants to become a "Member" of mobiChamp™ then the user can sign up as that, for free. The application would clearly outline the restrictions of that account, a main one being that a Member cannot open a Club and have a dashboard, etc. Within the descriptions presented supra it is depicted as the reverse. Accordingly, it would be evident that the subscription basis for a Member and an Owner may be payment based or free for either one or other or both. Where the Owner pays mobiChamp™ then their ROI arises from subsequent events etc. which Members register/pay for. Where the Member pays then they may be provided with a certain baseline service, e.g. a weekly business discussion from Bill Gates, after which they pay for additional events etc. In the subscription Member based approach a percentage or fixed fee type arrangement would provide revenue to mobiChamp™ and the Owner. Where the Owner pays and subsequently derives ROI from Member activities a fee based structure may also be established as a percentage of ROI to mobiChamp™ or an escalating fee schedule based upon the number of users and hence anticipated derived increases in ROI.

Login Screen: A user may provide an email and type the password twice to register. Once the user has registered to become an Owner or a Member, they will be led to the Clubs Screen. Optionally, login may be achieved through one or more SOCNET/SOME such as LinkedIn™ or Facebook™ for example.

Clubs Screen: This screen is similar for both Owners and Members, with some key differences.

Owner Clubs Screen: Here the Owner can see the clubs they are the owners of, and plus the clubs they are "Members" of. The Club Screen may have a "plus" sign at the top right, which may open a form to create a new Club: name, picture, description and membership fees. Also, whether the Club is private or public. A private club may not be searchable via the "Get Invited" screen except for Owners and may not receive Invitation Requests (from Owners/Members alike). Once the club is created then the Owner can go inside that particular Club and upload photos, upload a detailed biography about himself/company, etc.

Member Clubs Screen: The members can change their privacy settings and also view the clubs they are a part of Member's Club Screen does not have a "plus" sign at the top right.

Both the Owner and the Member may have the "Get Invited" button on the Clubs Screen so they can browse and join other Owner's clubs/

Get Invited Screen: This screen may allow the Members and Owners to browse profiles that are "Public" and send invitation requests to those clubs. Subsequently, a form for that specific club may come up explaining what the requirements are, such as monthly fees if any and/or a requirement the Owner/Member must have at least $1M in net worth or a high ranking government official. An Owner can also view clubs that are "Private" (but cannot send invitation requests). Moreover, an owner who is part of another owner's club with membership/event fees may get a mobiChamp™ discount.

Invitation Policy: Owners can send invitations to users who are currently are and are not members of mobiChamp™. Owners can also send invitations to other Owners to join their club. If the user is already a Member, the Member receives a notification/invitation, for example in their Clubs Screen: The club picture may be slightly greyed out, for example, and if the Member clicks on that Club, a pop-up or other screen change may ask whether the user wishes to be a part of that Club or not. Once the member presses "OK", the club picture becomes full colour and the Member can go inside the club. If the user not already a member, then an email is sent to the user with the website form to register ("Member" is already selected on the form) and download the application. Owners and users can both share the application on their SOCNETs/SOMEs such as LinkedIn™, Facebook™ and Twitter™ pages, for example.

Within the embodiments of the invention described supra in respect of FIGS. 1 to 23 the reference has been made primarily to private clubs. However, it would be evident that the PCSAPs described may also be provided in a public manner allowing, for example, an enterprise/user/retailer to offer a club type service to its customers based upon a subscription and/or free model. For example, American Express may offer different online clubs to cardholders with different cards, including for example, clubs directed to The Platinum Card®, AeroplanPlus® Platinum Card, American Express® AIR MILES® Platinum Credit Card, Blue Sky® Credit Card, and Holt Renfrew Card from American Express.

It would also be evident to one skilled in the art that mobiChamp™ applications may be branded according to different factors, such as demographic, business vertical, and pay/free access etc. For example, variants of the software application may be branded to a retailer, e.g. modiCostCo™; a community, e.g. mobiParis™; an enterprise, e.g. mobiSears™; a musician, e.g. mobiMoby™; or a teacher e.g. mobiMrDareshani, for example. Alternatively, other applications such as one directed specifically to a particular sport, e.g. golf through mobiGolf™ or particular demographic, e.g. professionals through mobiPro™, may exploit part or all of a mobiChamp™ application or applications. In these applications database design overlaps, for example, may ease the interfacing and integration of mobiChamp™ application(s) and/or feature(s) with other applications or their embedding into the other application(s).

For example, one or more tables within, for example mobiChamp™ and/or an associated application such as mobiPro™, may be referred to as core tables and accordingly, for example, whilst clients may be focused onto engaging through the mobiChamp™ application suite, for example, then in order to enable users to use all the application under mobiChamp™ application suite, e.g. mobiPro™, mobiGolf™, etc., then through such core tables in addition to clubs being linked then users can also be linked.

It would also be evident to one of skill in the art that one or more other applications may be linked to a mobiChamp™ application through one or more account tables which provide the user list table within one application and content elements within another application. Accordingly, a direct reference may be made to the primary key of the other application to link this to the mobiChamp™ application and therein the multiple users of other application. For example, where a mobiChamp™ application addresses a real estate application, which is intended to contain a list of properties, then a table such as that depicted below in respect of Table 1 can be provided/implemented wherein an owner is linked to a user account primary key account identifier. As a result, by referencing the primary keys of Account and Club tables, It is possible to logically link other applications with a mobiChamp™ application/model. Similarly, by adding additional tables to the schema it would be possible to include other applications.

TABLE 1

Exemplary Table Layout for Adding Properties from Another Application to a mobiChamp™ application

| Property Identity | Name | Location | Price | Owner |
|---|---|---|---|---|
| MLS-12345 | ABCDEF | ABCDEF | $123,456 | PK AccountID#1 |
| ... | ... | ... | ... | ... |
| MLS-56789 | UVWXYZ | UVWXYZ | $123,456 | PK AccountID#N |

Within the descriptions supra in respect of FIGS. 1 to 23 with respect to embodiments of the invention content may be uploaded by users/enterprises in association with their "Club" etc. However, within other embodiments of the invention this uploaded content may form part of "content market" wherein the PCSAPs, such as mobiChamp™ for example, whilst supporting multiple channels and dynamic content may also provide a platform to centrally manage, monetize and market content. For example, if a video is uploaded via mobiChamp™ then a value may be applied to it allowing it to be posted via the club or clubs associated with the user posting the content, for example, or to a dedicated market place allowing all users, predetermined subsets of users etc. to access it, view it and purchase the content. For example, a Club such as "Andre Agassi Club" may allow users to purchase uploaded content. Alternatively, the content uploaded may be within a marketplace accessible only to members with Clubs meeting predetermined criteria relative to the posted content/poster/posting Club association. For example, the predetermined criterion in the instance of the "Andre Agassi Club," for example, is that the marketplace is accessible to only members within Clubs that are tennis related.

Accordingly, the marketplace may be dynamically provided to the user based upon the Club they are currently logged into. Hence, in the example above a user may log into their tennis club via mobiChamp™ and have access to content within the marketplace defined through the rules within the marketplace such that all other tennis related content is accessible to them. If they then log out and then log in back to the "Donald Trump" Club then the content accessible within the marketplace has now changed. If they are the "owner" of a Club rather than a member then the content that they can access within the marketplace may similarly vary such that, for example, a user may post content with a high value for use by other Clubs, for example, a marketing pitch, voice overlay to an advertisement, etc. However, members of the club are only able to access, for example, skill development content. In some instances, the uploaded content may be sampled and uploaded to YouTube™, for example, allowing it to be searched and identified from a wider range of relating to sell it on Clubify, market it on Facebook/Twitter and also upload a free video to YouTube and so forth. This may then allow links to be made/accessed back to the original content within the marketplace allowing expanded consumption/monetization of the content. For example, a band may upload content for its Club members to purchase whilst providing through the posted free sample/content a marketing hook to bringing additional members to their club.

Optionally, a Club created within the scope of embodiments of the invention may be defined as a "Donation Club" wherein users can subscribe to become part of a "Donation Club" to provide monthly donations but also receive exclusive/specific updates on the project they are donating to. In many instances, charities are national whilst users are local and would like to donate/impact locally and/or be provided with updates that are local. Such abilities add to the transparency and engagement required for charities, not-for-profit (NFP) organisations etc. in order to maintain community engagement and funding. For example, the Children's Hospital of Eastern Ontario (CHEO) may establish a "Children's Cancer Research Club" to which individuals, enterprises may join with monthly subscription in return for which they receive access to content/information posted. Optionally, CHEO and the Children's Hospital of Western Ontario may form a common club.

It would be evident that within the embodiments of the invention described supra that any Club may have multiple levels of membership or it may have a single membership level or it may have individual/corporate membership levels. For example, a club may offer free, bronze, silver, and gold memberships with different subscription levels per annum, per month etc.

Ethical Cryptocurrency

A cryptocurrency is a digital medium of exchange. Fundamentally, cryptocurrencies are specifications regarding the use of currency which seek to incorporate principles of cryptography to implement a distributed, decentralized and secure information economy. When comparing cryptocurrencies to flat money, traditional currency, the most notable difference is in how no group or individual may accelerate, stunt or in any other way significantly abuse the production of money. Instead, only a certain amount of cryptocurrency is produced by the entire cryptocurrency system collectively, at a rate which is bounded by a value both prior defined and publicly known. Typically, a cryptocurrency is a type of digital token that relies on cryptography for chaining together digital signatures of token transfers, peer-to-peer networking and decentralization. In some cases a proof-of-work scheme is used to create and manage the currency.

Within two embodiments of the invention described below ethical cryptocurrency is presented in respect to two religious perspectives. However, it would be evident that other ethical belief systems may also be employed as the basis of an ethical cryptocurrency including, but not limited to, religious beliefs, philosophical beliefs, protection of the environment, avoidance of child labour, reduction of gender imbalances in the third world, etc.

Halal Cryptocurrency

A Halal cryptocurrency, for example which may be called HalalCoin™, is similar to other cryptocurrencies in terms of the operating principles such as being, for example, a digital token exploiting cryptography with digital signature proofed transfers although other implementations of cryptocurrencies may be employed without departing from the scope of the invention. However, unlike other cryptocurrencies, HalalCoin™ has limits in respect to the expenditure/use/holding of the HalalCoin™ cryptocurrency.

Accordingly the HalalCoin™ may not be used in respect of predetermined services and/or goods and/or activities as established under the HalalCoin™ protocol or charter. Examples of such services/goods/activities may include, but not be limited to, the following:

Investment, trading, purchase, sale, etc. into any activity, enterprise, organization, etc. in a manner directly or indirectly contrary to the Quran, also known as Qur'an or Koran, being the central religious text of Islam. The Quran being also used along with the hadith to interpret sharia law.

Interesting Charging Financial Instruments and/or Organizations

Avoidance of Riba in all transactions, wherein according to a use of the Quranic term in "usury" it relates to the debtor returning a sum of goods in excess or above the original agreed transaction, be it money, commodity, any other item or goods or services; anything in excess of original agreed agreement is considered riba if items exchanged are of the same kind.

Investment, trading, purchase, sale etc. into any aspect of pork production, distribution, sale and purchase.

Gambling, e.g. online gaming, casinos, etc.

Investment, trading, purchase, sale etc. into any aspect of alcohol production, distribution, sale and purchase.

Investment, trading, purchase, sale etc. into any aspect of tobacco production, distribution, sale and purchase.

Investment, trading, purchase, sale etc. into any aspect of non-pharmaceutical/non-medicinal drug production, distribution, sale and purchase.

Investment, trading, purchase, sale etc. into any aspect of pornography production, distribution, sale and purchase.

Investment, trading, purchase, sale etc. into any aspect of weapons/ammunition production, distribution, sale and purchase.

Investment, trading, purchase, sale etc. into any aspect of production, distribution, sale and purchase of information that may be considered "gossip" and/or "hearsay".

Investment, trading, purchase, sale etc. into any aspect of violence and/or violent behaviour.

Halal Currency and Payment System

HalalBank™ may represent part or all of a payment system, currency exchange and remittance network. It may be built upon a distributed, open source internet protocol, consensus ledger and native currency, such as HalalCoin™ for example although other cryptocurrencies such as Bitcoins, Ripples, Litecoins, etc. may also be handled, managed, distributed, traded, employed as part of HalalBank™. The HalalBank™ supports and enables a secure, high-efficiency, low latency global financial infrastructure for cryptocurrency transactions of any size. At its core, HalalBank™ is based around a shared, public database or ledger which in addition to balances, holds information about offers to buy or sell currencies and assets, creating a distributed exchange. Participants in the network agree to changes in the ledger via a process called consensus which is reached at a rate determined by the scope/extent of the HalalBank™ and the currency transaction volumes. A consensus process allows for payments, exchanges and remittance without the need for a centralized clearing house as part of HalalBank™. Accordingly consensus ledger makes the HalalBank™ network energy efficient and robust against attacks compared to other cryptocurrencies.

In a similar manner to HalalCoin™ the HalalBank™ does not allow transactions to be made by or to individuals, enterprises, etc. or to be used in respect of predetermined services and/or goods and/or activities as established under the HalalCoin™ protocol or charter. Examples of such limitations are described supra in respect of HalalCoin™ and may related to at least one of an individual, an organization, a group, an enterprise, a product, a service, a class of service, and a class of goods.

Kosher Cryptocurrency

A Kosher cryptocurrency, for example which may be called KosherCoin™, is similar to other cryptocurrencies in terms of the operating principles such as being, for example, a digital token exploiting cryptography with digital signature proofed transfers although other implementations of cryptocurrencies may be employed without departing from the scope of the invention. However, unlike other cryptocurrencies, KosherCoin™ has limits in respect to the expenditure/use/holding of the KosherCoin™ cryptocurrency. However, Accordingly the KosherCoin™ may not be used in respect of predetermined services and/or goods and/or activities as established under the KosherCoin™ protocol or charter. Examples of such services/goods/activities may include, but not be limited to, the following:

Investment, trading, purchase, sale, etc. into any activity, enterprise, organization, etc. in a manner directly or indirectly contrary to the Halakha, also known as Halakha, Halacha, Halachah, or Halocho. The Halakha being the collective body of Jewish religious laws derived from the Written and Oral Torah including the 613 mitzvot ("commandments"), talmudic and rabbinic law, and the customs and traditions compiled in the Shulchan Aruch (commonly known as the "Code of Jewish Law").

Avoidance of Ribbit in all transactions, wherein according to a use of the Halakha term in meaning a "bite" (neshekh) or a gain by a creditor relating to a loan to a debtor (marbit/tarbit), be it money, commodity, any other item or goods or services. Neshekh refers to interest charged by deducting it from the loaned amount prior to handing it over whereas marbit/tarbit relates to interest charged by adding it to the amount due to be repaid. However, whilst the Torah and Talmud encourage the granting of loans if they do not involve interest, the Halakha law regarding free loans applies only to loans made to other Jews. It is permissible to make loans with interest to non-Jews.

Investment, trading, purchase, sale etc. into any aspect of enterprise, businesses, individuals etc. who directly or indirectly cause work to be undertaken on the Shabbat or Shabbos.

Investment, trading, purchase, sale etc. into any aspect of non-Kosher food.

Investment, trading, purchase, sale etc. into any aspect of an activity contrary to the Halakha.

Kosher Currency and Payment System

KosherBank™ may represent part or all of a payment system, currency exchange and remittance network. It may be built upon a distributed, open source internet protocol, consensus ledger and native currency, such as KosherCoin™ for example although other cryptocurrencies such as Bitcoins, Ripples, Litecoins, etc. may also be handled, managed, distributed, traded, employed as part of KosherBank™. The KosherBank™ supports and enables a secure, high-efficiency, low latency global financial infrastructure for cryptocurrency transactions of any size. At its core, KosherBank™ is based around a shared, public database or ledger which in addition to balances, holds information about offers to buy or sell currencies and assets, creating a distributed exchange. Participants in the network agree to changes in the ledger via a process called consensus which is reached at a rate determined by the scope/extent of the KosherBank™ and the currency transaction volumes. A consensus process allows for payments, exchanges and remittance without the need for a centralized clearing house as part of KosherBank™. Accordingly consensus ledger makes the KosherBank™ network energy efficient and robust against attacks compared to other cryptocurrencies.

In a similar manner to KosherCoin™ the KosherBank™ does not allow transactions to be made by or to individuals, enterprises, etc. or to be used in respect of predetermined services and/or goods and/or activities as established under the KosherCoin™ protocol or charter. Examples of such limitations are described supra in respect of KosherCoin™ and may related to at least one of an individual, an organization, a group, an enterprise, a product, a service, a class of service, and a class of goods.

Crowdsport

Within the prior art crowd sourcing typically relates to the acquisition of content or information from a group of contributors. Recently, private funding of activities has become an element of start-ups, charities, and other ventures seeking to exploit the ability for individuals locally and globally to contribute to the activity. Such crowd sourcing financing activities are typically limited to the collection of finance to sustain an initiative from a large pool of backers where the initiative may, for example, be a nonprofit campaign (e.g. to raise funds for a school or social service organization), a political campaign (to support a candidate or political party), a philanthropic campaign (e.g. for emergency funds for an ill person or to produce an emerging artist), a commercial campaign (e.g. to create and sell a new product) or a financing campaign for a start-up company. However, beyond their initial financial contribution and any subsequent repeated viewing of the webpage/domain they identified the crowd sourcing from their interaction and contributions are minimal. According, to an embodiment of the invention a user may, upon providing crowd sourced funding, be invited to join a private club formed exploiting an embodiment of the invention thereby providing them with increased information but also providing the crowd funding entity with the ability to further engage and manage interactions with crowd funding users in a significantly more controlled manner as well as tracking these users explicitly and being able to offer through the private club additional closed sources of funding from the original crowd sourcing community who are now members of the private club.

Alternatively, those wishing to partake within a crowd sourcing activity may request to join a private club such as described supra in respect of embodiments of the invention. Within an embodiment of the invention the crowd sourcing may be specifically for sports, e.g. nonprofit/philanthropic/commercial, for helping developing sports in the community. In this manner, a country, a sports team, or an athlete for example wanting to raise funds can do so by exploiting a specific mobile application or an application on any other device platform according to an embodiment or embodiments of the invention.

Dementer

Dementer™ refers to a Robot versus Robot versus real-time multiplayer game provided on PED and FED devices including consoles and any interface supporting HTML5 web. Accordingly, Dementer™ exploits syntactic features such as <video>, <audio> and <canvas> elements, as well as the integration of scalable vector graphics (SVG) content and Mathematical Markup Language (MathML) for mathematical formula integration. Accordingly, Dementer™ provides a gaming application allowing direct handling of multimedia and graphical content on the web without having to resort to proprietary plugins and application programming interfaces (APIs).

Dementer™ allows for:
 exploitation of a multiplayer platform, such as Unity Multiplayer for example, allowing players from all over the world to play other players with non-planned entry and exit of players from the multiplayer environment.

In game or in application purchasing of upgrades such as shields, power ups, new mechanics, new robots, software enhancements, etc.

In game or in application "cannibalism" of robot by victorious robot to acquire additional shields, power, mechanics, tools, weapons, motion means, software revisions, software upgrades, etc.

Automatic or selective matching of players within the environment based upon factors including, but not limited to, robot capabilities, location, fight history, score etc.

Online globally based score management, leaderboards, etc.

Experience level tracking within game and within application.

Direct integration of social media interfaces for real time embedding of comments, questions, responses, etc. within the gaming environment either through text based interfaces or enhanced features such as speech recognition/generation from/to the current players or current player(s) and friends within active social network(s) which may be established by the player through their settings;

Establishment of social media groups based upon discrete, groups, or classes of robots within Dementer™.

Direct player engagement with platform independence so players can be on multiple platforms to play, e.g. Playstation™, Wii™, Xbox™, as well as iOS based devices such as iPhone/iPod/iPad etc. and devices exploiting Windows or Android operating systems.

Direct player engagement with "levelling" features such that where users are exploiting different gaming or access platforms, such as Playstation™ Wii™ Xbox™, as well as iOS based devices such as iPhone/iPod/iPad etc. and devices exploiting Windows or Android operating systems, then their robot control features are "leveled" to the minimum overlapping function/control set provided by the two or more player controllers/devices.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method comprising:
   providing an owner with access to a software application in execution upon a server for generating an automatically generated framework for both a web portal accessible through a web browser and a software application for execution by a portable electronic device; wherein
   a first predetermined portion of the automatically generated framework relates to a web portal for a club to which members are required to subscribe in order to access club services;

a second predetermined portion of the automatically generated framework relates to the establishment of a plurality of social networks relating to the club whose members are members of the club;

providing the server comprising a microprocessor, a non-transitory computer storage medium (memory) comprising computer executable instructions and a software application and an interface to a communications network where the computer executable instructions when executed by the server configure the server to:

establish a first web portal via the communications network allowing the owner to access the software application in execution upon the server;

render to the owner a sequence of questionnaires relating to the club upon a graphical user interface of an electronic device coupled to the communications response;

receive responses from the owner generated via an input interface of the electronic device;

automatically establish a framework upon the server accessible to other users generated by the software application in dependence upon the responses from the owner to the sequence of questionnaires; and allow members of the club to generate and execute financial transactions via at least one of the web portal and a subset of the plurality of social networks; wherein the automatically generated framework provides:

a second web portal accessible through another web browser allowing a registered member of the club to access a plurality of screens each relating to a function accessible to a registered user of the web portal; and a software application for downloading and execution upon portable electronic devices associated with users allowing the users to register as members with a subset of a plurality of clubs, the club being one of the subset of the plurality of clubs;

members of the club are automatically enrolled as members of each social network of the one or more social networks; and members are required to subscribe to the club in order to access club services and club information.

2. The method according to claim 1; wherein at least one of:

a predetermined subset of the members are linked to the club established by the automatically generated framework from another club automatically through a common reference table established and accessed by the software application; and a predetermined subset of the members are linked to the club from another club automatically through common reference tables within software applications providing the club and the another club upon an electronic device.

3. The method according to claim 1, wherein the financial transactions employ an ethical cryptocurrency having an associated protocol or charter which defines limitations for the ethical cryptocurrency preventing it being used for transactions associated with the limitations; and the restrictions on the use of the ethical cryptocurrency within the associated protocol or charter are established by the owner.

4. The method according to claim 1, wherein the software application established by the automatically generated framework for the club also provides at least one of registration for users and access to the club for members.

5. The method according to claim 1, wherein the financial transactions between members of the club established via at least one of the web portal and a subset of the plurality of social networks employ an ethical cryptocurrency having an associated protocol or charter which defines limitations for the ethical cryptocurrency preventing it being used for transactions associated with the limitations; and the associated protocol or charter which prevents the ethical cryptocurrency from being used for at least one of predetermined services, predetermined goods, and predetermined activities are based upon an ethical policy.

6. The method according to claim 1, wherein the financial transactions between members of the club established via at least one of the web portal and a subset of the plurality of social networks employ an ethical cryptocurrency having an associated protocol or charter which defines limitations for the ethical cryptocurrency preventing it being used for transactions associated with the limitations; and the associated protocol or charter which prevents the ethical cryptocurrency from being used for at least one of predetermined services, predetermined goods, and predetermined activities is defined with respect to at least one of a religion and a religious belief.

7. The method according to claim 1, wherein the financial transactions between members of the club established via at least one of the web portal and a subset of the plurality of social networks employ an ethical cryptocurrency having an associated protocol or charter which defines limitations for the ethical cryptocurrency preventing it being used for transactions associated with the limitations; and the associated protocol or charter which prevents the ethical cryptocurrency from being used for at least one of predetermined services, predetermined goods, and predetermined activities is defined with respect to at least one of an individual, an organization, a group, and an enterprise.

8. The method according to claim 1, wherein the financial transactions between members of the club established via at least one of the web portal and a subset of the plurality of social networks employ an ethical cryptocurrency having an associated protocol or charter which defines limitations for the ethical cryptocurrency preventing it being used for transactions associated with the limitations; and the associated protocol or charter which prevents the ethical cryptocurrency from being used for at least one of predetermined services, predetermined goods, and predetermined activities is defined with respect to a product, a class of products, a service, a class of service, and a class of goods.

9. The method according to claim 1, wherein the financial transactions between members of the club established via at least one of the web portal and a subset of the plurality of social networks employ an ethical cryptocurrency having an associated protocol or charter which defines limitations for the ethical cryptocurrency preventing it being used for transactions associated with the limitations; and the ethical cryptocurrency is one of a plurality of ethical cryptocurrencies, each ethical cryptocurrency having an associated protocol or charter defined with respect to at least one of a religion and a religious belief.

10. The method according to claim 1, wherein the financial transactions between members of the club established via at least one of the web portal and a subset of the plurality of social networks employ an ethical cryptocurrency having an associated protocol or charter which defines limitations for the ethical cryptocurrency preventing it being used for transactions associated with the limitations; and the ethical cryptocurrency is at least one of handled, managed, distributed, traded and employed by at least one of a payment system, a currency exchange, and a remittance network; wherein the at least one of the payment system, the currency exchange, and the remittance network does not allow transactions to be made at least one of an individual, an organization, a group, and an enterprise as established by the associated protocol or charter for the ethical cryptocurrency.

11. The method according to claim 1, wherein the financial transactions between members of the club established via at least one of the web portal and a subset of the plurality of social networks employ an ethical cryptocurrency having an associated protocol or charter which defines limitations for the ethical cryptocurrency preventing it being used for transactions associated with the limitations; and the ethical cryptocurrency is at least one of handled, managed, distributed, traded and employed by at least one of a payment system, a currency exchange, and a remittance network; wherein the at least one of the payment system, the currency exchange, and the remittance network does not allow transactions to be made in respect of at least one of a product, a class of products, a service, a class of service, and a class of goods as established by the associated protocol or charter for the ethical cryptocurrency.

12. The method according to claim 1, wherein the club is one of a plurality of clubs;

each club of the plurality clubs has a web portal generated by an instance of the automatically generated framework executed by each owner of the club of the plurality clubs; and a member of a predetermined subset of the plurality of clubs can access each club of their subset of the plurality of clubs through a common access page of the web portal; wherein the club of the predetermined subset of the plurality of clubs accessed by the member is established in dependence upon a selection relating to the club of the predetermined subset of the plurality of clubs through the common access page.

\* \* \* \* \*